March 27, 1956 H. F. STORM 2,740,044
RESISTANCE WELDING MONITOR CONTROL
Filed Oct. 25, 1952 4 Sheets-Sheet 3

Fig.1c.

Inventor:
Herbert F. Storm,
by
His Attorney.

March 27, 1956

H. F. STORM 2,740,044

RESISTANCE WELDING MONITOR CONTROL

Filed Oct. 25, 1952

Inventor:
Herbert F. Storm,
by Claude H. Matt
His Attorney.

United States Patent Office 2,740,044
Patented Mar. 27, 1956

2,740,044

RESISTANCE WELDING MONITOR CONTROL

Herbert F. Storm, Schenectady, N. Y., assignor to General Electric Company, a corporation of New York Application October 25, 1952, Serial No. 316,841

17 Claims. (Cl. 250—27)

My invention relates to a resistance welding monitor and control which is responsive to the percentage drop in resistance across a weld during its formation. It is characterized by the use of electric computer circuits one of which determines the quotient of two electrical values and the other of which determines a ratio of electric values which is indicative of the percentage change from one value to the other.

In resistance welding two or more parts are joined together by passing electric current through the parts at the desired point of welding through electrodes which engage these parts and apply a predetermined pressure thereto. The resistance welding operation may be variously modified by controlling the time of current flow, the pattern of current flow, and the welding pressure applied to the work through the electrodes. For any particular operation a predetermined procedure is established which will produce welds of desired quality and strength. Since the weld is hidden from view by reason of its existence between the parts being welded, it is quite desirable to provide some means of protecting against any change from the original welding set-up conditions which may occur while a welding operation is being repeated. For example, variations in welding current flow may occur due to variations in the supply voltage or faulty operation of the current control apparatus. Likewise, variations in pressure may occur due to faulty operation of the welding machine or the wear imposed on the electrodes which causes them to change their area of contact with the work. This variation in contact area between the electrodes and the work may also produce a change in current density at the weld and thus also produce defective welds. There is also the variable factor resulting from variations in the surface condition of the parts being welded since this will affect the flow of welding current through the parts and the heating effect produced at their contacting surfaces. These and other variables may be productive of defective welds.

It is not possible to determine the strength of a resistance weld by a mere visual observation thereof. It is, of course, possible to make destructive tests of the weld, but this cannot be applied to a finished article employing the weld. Consequently, quality control procedures have been established whereby, through a sampling process, the departure from established welding conditions is detected before the strength and quality of the welds being made have deteriorated beyond established manufacturing limits which require the welds to be of predetermined strength and quality. Other procedures have been proposed to determine the strength and quality of welds by using such non-destructive tests as examination by X-ray and by the use of supersonics. Certain other tests have been propose which depend upon the voltage across the weld, the electric input to the weld, and the resistance change of the weld. More recently it has been proposed to make a determination of the strength and quality of a weld by determining the percentage resistance change from its maximum value during the formation thereof. In order to make such a determination, however, it is necessary to provide a control which will determine the quotient of two values and thereafter determine when the ratio of the two values has attained a resultant which is indicative of the desired percentage change in resistance of the weld.

It is an object of my invention to provide a resistance welding monitor and control which is responsive to the percentage change in resistance across a weld during its formation.

It is also an object of my invention to provide electric computing circuits which will determine the quotient of two values and the ratio of two values which are indicative of the desired percentage change in these values.

It is another object of my invention to couple the above-mentioned computer circuits one with the other to provide an output signal which indicates the attainment of a predetermined percentage drop in resistance of a weld during its formation.

It is a further object of my invention to provide apparatus which not only gives an indication upon the attainment of the desired percentage change in resistance across a weld during its formation, but which also controls the welding operation in response to such change.

Further objects of my invention will become apparent from the following consideration of the construction and operation of the embodiments of my invention illustrated in the accompanying drawings.

Figure 1A:
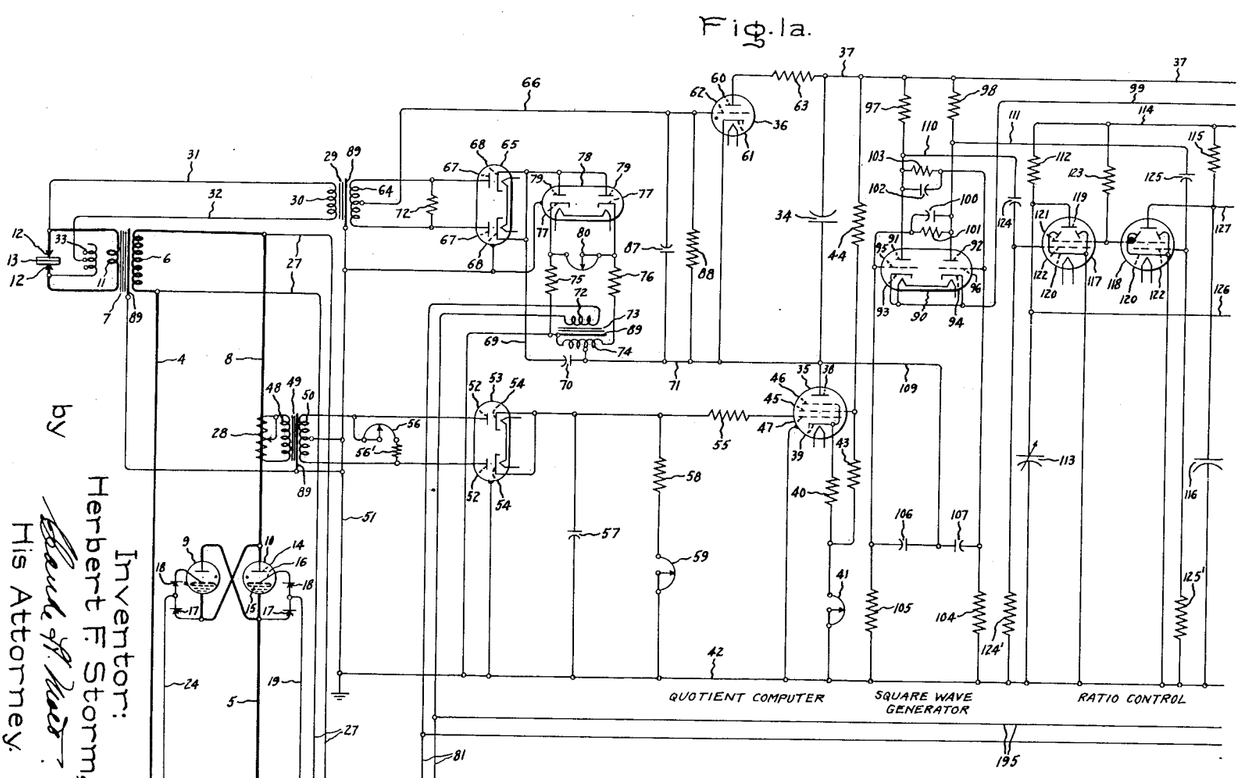
Fig. 1a of these drawings is a diagrammatic view of part of a weld monitor and control embodying my invention.
Figure 1B:
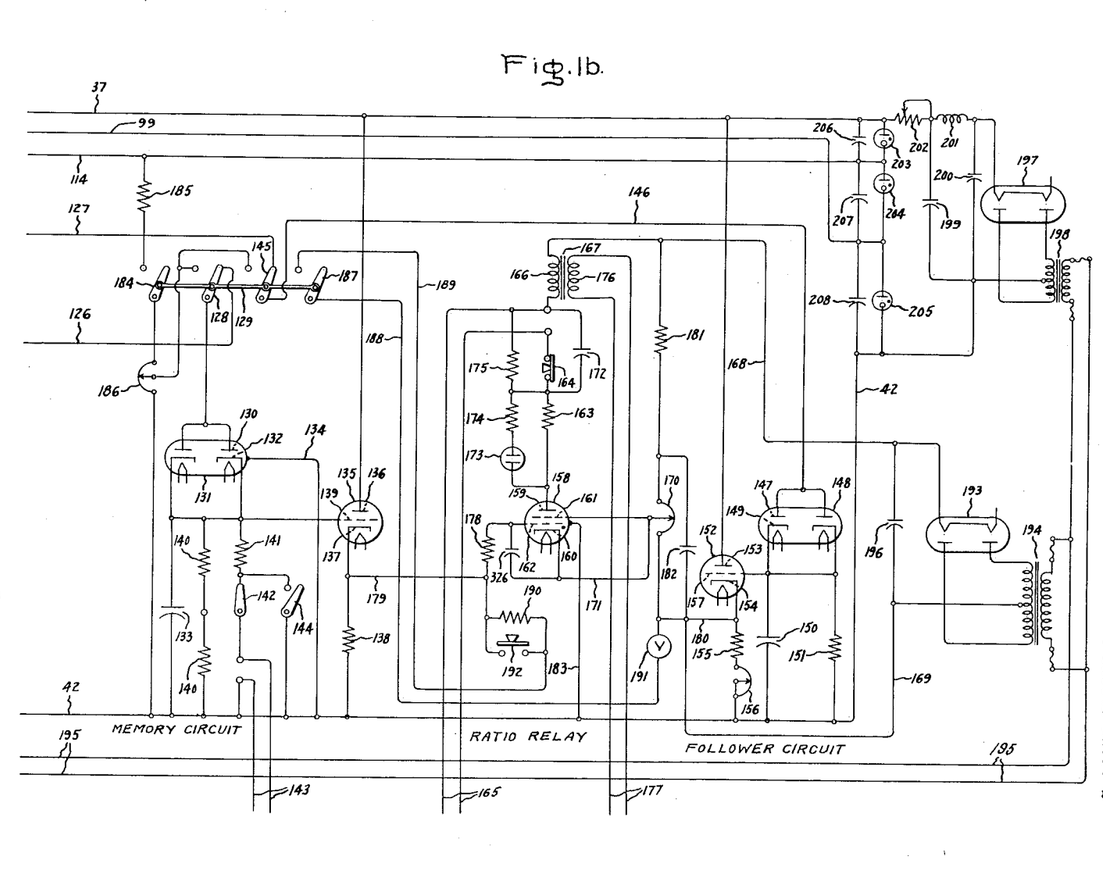
Fig. 1b is a diagrammatic representation of another part thereof.
Figure 1C:
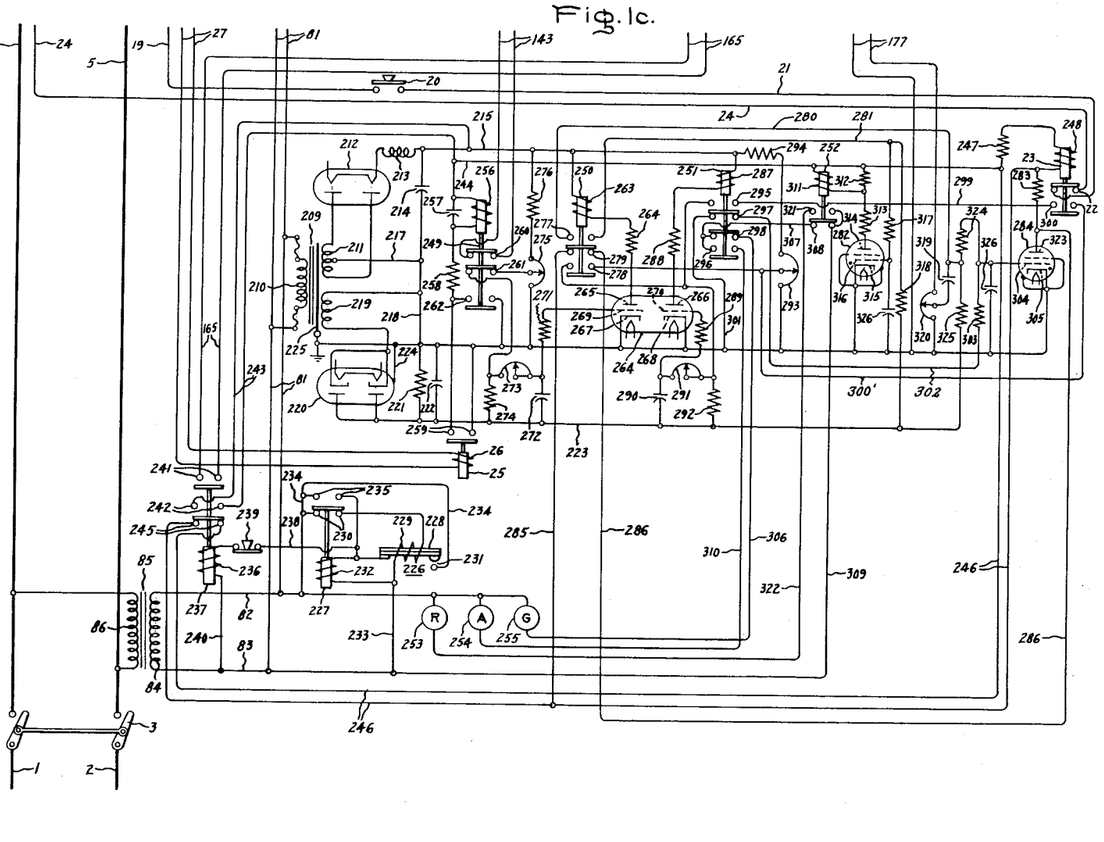
Fig. 1c is a diagrammatic representation of the remaining part thereof.

In the embodiment of my invention illustrated in Figs. 1a, 1b, and 1c the changing resistance of the weld is determined during its formation by the change in the operating frequency of an oscillator preferably a relaxation oscillator. The operating frequency of this oscillator is controlled by voltage input values which vary with the current through the weld and the voltage across the weld both of which depend on the resistance of the weld. As will be demonstrated below, the applications of these control voltages are such that the frequency of operation of the oscillator is proportional to the resistance of the weld being made. An output frequency of this relaxation oscillator is fed to a square wave generator which controls the charging periods of two capacitors each of which is connected in its own resistor-capacitor circuit. These resistor-capacitor circuits are adjusted to have time constants which are in the desired ratio of the final period of the frequency of the relaxation oscillator to its maximum period which are respectively indicative of the final resistance and the maximum resistance of the weld which will produce the desired percentage drop in resistance which is to be determined. A ratio relay is provided for indicating the occurrence of this desired change and the output of this relay is employed for operating suitable signals and for controlling the flow of welding current to the weld.

My invention will be better understood from a consideration of the embodiment thereof illustrated in Figs. 1a, 1b, and 1c and a consideration of its operation in view of the theory therefor which will be explained by referring to certain equations and the disclosures in some of the remaining figures of the drawings.

The diagrammatic representation of a resistance welding circuit and the circuits of one embodiment of my weld monitor and control will be obtained if the three sheets of drawings for Figs. 1a, 1b, and 1c are turned on their side and assembled with Fig. 1b to the right of Fig. 1a and Fig. 1c immediately below Fig. 1a. With this assembly, the circuits of Fig. 1a which end at the right-hand edge of this view, will register with the circuits of Fig. 1b, which end at the left-hand edge thereof, and the circuits of Fig. 1a, which end at the left bottom edge of this view, will register with the circuits that end at the top left edge of Fig. 1c. Three pairs of conductors which end at the bottom of Fig. 1b are continued by three pairs of correspondingly spaced conductors which end at the upper right-hand edge of Fig. 1c.

Since the operation of the weld monitor and control is dependent on electrical conditions in the weld circuit, the welding circuit will be described first. This circuit and the welder forming part thereof have been illustrated diagrammatically in simplified form along the left-hand portions of Figs. 1a and 1c. It is to be understood that any form of welder and control therefor may be used and that the circuit illustrated has been given only to illustrate one manner in which my weld monitor and control may be associated with a typical welding circuit.

Electric current is supplied to the welding circuit shown in Figs. 1a and 1c from a suitable source alternating current through conductors 1 and 2 and the contacts of a switch 3 which, when closed, energize conductors 4 and 5. Conductor 4 is connected to one terminal of the primary winding 6 of a welding transformer 7 and the other terminal of this primary winding 6 is connected through a conductor 8 and a pair of reversely connected electric discharge devices 9 and 10 to conductor 5. Consequently, when the electric discharge devices 9 and 10 become conducting the primary winding 6 of the welding transformer 7 is energized and consequently energizes its secondary winding 11, the terminals of which are connected to the resistance welding electrodes 12 which engage and supply welding current to the work parts 13 which are located therebetween during a welding operation.

The electric discharge devices 9 and 10 which control the flow of welding current may be ignitrons. Each of these devices has an anode 14, a mercury pool cathode 15, and a control element 16 of high resistance material, one end of which is immersed in the mercury pool cathode associated therewith. These elements of each of these devices are enclosed within an envelope containing a gas or vapor such as argon or mercury as indicated by the dot associated with their cathodes. The cathodes 15 of these devices are connected to their control elements through a pair of series-connected rectifiers 17 and 18 which are poled to conduct current from the cathode to the control element. The control element circuit for these devices extends from the common terminals of one pair of contact rectifiers 17 and 18 through a conductor 19, the contacts of a control pushbutton 20, conductor 21, the normally closed contacts 22 of a relay 23, and a conductor 24 to the common terminals of the other pair of contact rectifiers 17 and 18.

The circuits of the weld monitor have been shown in Figs. 1a and 1c and the salient parts thereof have been identified by legends supplied immediately below these parts. The control circuits operated in response to the output signal of the monitor have been illustrated in Fig. 1a. The connections of the weld monitor and control which are sensitive to electrical conditions in the welding circuit will now be described.

The control circuits of Fig. 1c are made operative upon the flow of welding current in the welding circuit by the pick-up of a relay 25 whose operating winding 26 is connected through conductors 27 across the primary winding 6 of the welding transformer. Further description of these circuits will be given below after the organization of the weld monitor has been described.

The weld monitor receives input voltage signals which are proportional to the current flow through the weld and the voltage across the weld during its formation. Both of these signals will vary depending on the resistance of the weld since the voltage across the weld is the product of this resistance and the current flow through the weld.

A signal voltage which is proportional to the current flow in the welding circuit is supplied to the monitor by a current transformer 28 and a signal proportional to the voltage across the welding electrodes is supplied to the monitor by a voltage transformer 29. The primary winding 30 of this voltage transformer is connected to the welding electrodes 12, or the supports therefor, through conductors 31 and 32 and a voltage compensator 33 located in the throat of the welding machine. This compensator is so adjusted in the throat of the welding machine as to have induced therein voltages equal and opposite to the voltages induced in the conductors extending along the throat area of the secondary winding circuit of the welding transformer so that the voltage applied to the primary winding 30 of voltage transformer 29 will be a true representation of the voltage across the welding electrodes and consequently the voltage drop through the work parts during a welding operation.

The signal voltages which are respectively proportional to the current flow through the weld and the voltage across the weld are employed to control the oscillation frequency of a relaxation oscillator identified in Fig. 1a as the quotient computer. As will be explained below, the frequency of oscillation of this oscillator under the control of these signal voltages will have a value proportional to the conductance of the weld which is the reciprocal of its resistance. This arrangement has been employed since the second computer circuit, a ratio control circuit which is used for determining the ratio of values which will give an indication when the desired percentage decrease in resistance is obtained, is made responsive to the frequency output of the quotient circuit and operates to make a comparison of the time periods of its oscillations and thereby consequently of resistance values since the period of an oscillation is the reciprocal of its frequency of operation.

The relaxation oscillator, shown in Fig. 1a and identified therein as the "quotient computer," comprises a capacitor 34 which is charged through the anode-cathode circuit of an electric discharge device 35 and discharged through the anode-cathode circuit of an arc discharge device 36. The electric discharge device 35 may be a 6SH7 which is a pentode having substantially constant anode current flow for each of its control element voltages when its anode voltages are above a predetermined value. Thus, depending upon its control element excitation, it will supply charging current to capacitor 34 at a rate determined by its control element voltage when operating at anode voltages above this predetermined value.

One terminal of capacitor 34 is connected to a direct current supply conductor 37 and its other terminal is connected to the anode 38 of electric discharge device 35. The cathode 39 of this electric discharge device is connected through a degenerative resistor 40 and a rheostat 41 to another direct current supply conductor 42 which, as indicated in the drawing, is connected to ground. Rheostat 41 forms part of a potentiometer circuit which includes resistors 43 and 44 connected in series with one another across the direct current supply conductors 37 and 42. The screen grid 45 of electric discharge device 35 is connected between resistance elements 44 and 43 of this potentiometer and the suppressor grid 46 of this device is connected to its cathode 39. The control element or control grid 47 of this device is connected to its cathode 39 through a control circuit into which are introduced control voltages which vary in accordance with the magnitude of the resistance welding current flow in the welding circuit. This circuit is fed by the output of the current transformer 28 which energizes the primary winding 48 of a transformer 49 having a secondary winding 50. Secondary winding 50 of transformer 49 is provided with a mid terminal which is connected through a conductor 51 which is in turn connected to the direct current supply conductor 42. The end terminals of the secondary winding 50 of transformer 49 are connected to the anodes 52 of a double diode 53 whose cathodes 54 are connected together and through a (current limiting) resistor 55 to the control element 47 of electric discharge device 35. Thus, depending on the magnitude of current flow in the resistance welding circuit, full wave rectified voltages proportional thereto are introduced into the control element circuit of electric discharge device 35. The relative magnitude of these voltages may be controlled by the adjustment of a rheostat 56 which is connected in series with a resistor 56' across the end terminals of the secondary winding 50 of transformer 49. A filter, comprising a capacitor 57 and its parallel connected circuit including a resistor 58, and a rheostat 59, is connected across the control element 47 and cathode 39 of electric discharge device 35. Rheostat 59 is provided for adjusting the ripple of this filter to match with that of the filter connected across the control element and cathode of arc discharge device 36.

Arc discharge device 36 may be a GL884 having an anode 60, a cathode 61, and a control element 62, all of which elements are enclosed within an envelope containing a gas or vapor such as argon or mercury as indicated by the dot associated with its cathode 61. The anode-cathode circuit of arc discharge device 36 is connected across the terminals of capacitor 34 through a current limiting resistor 63. A full wave rectified voltage is introduced into the control element to cathode circuit of arc discharge device 36 by a circuit arrangement including the secondary winding 64 of transformer 29 and the anode-cathode circuits of a double diode 65. The secondary winding 64 of transformer 29 is provided with a mid terminal which is connected through a conductor 66 to the control element 62 of arc discharge device 36 and with end terminals which are connected to the anodes 67 of a double diode 65 whose cathodes 68 are connected together and through a conductor 69, a capacitor 70, and a conductor 71 to the cathode 61 of arc discharge device 63. A loading resistor 72 is connected across the end terminals of the secondary winding 64 of transformer 29.

Capacitor 70 connected in the control element circuit of electric discharge device 36 is provided for introducing a predetermined negative bias voltage in this circuit for reasons that will become apparent as the description proceeds. This capacitor is charged by the alternating voltage applied to the secondary winding 73a of a transformer 73 having a secondary winding 74. This secondary winding 74 has a mid terminal which is connected to one of the terminals of capacitor 70 and end terminals which are connected through resistors 75 and 76 to the cathodes 77 of a double diode 78 whose anodes 79 are connected together and through a conductor 69 to the other terminal of capacitor 70. A rheostat 80 connected across the cathodes 77 of double diode 78 provides a means for adjusting the magnitude of the voltage charge applied to capacitor 70.

The primary winding 73a of transformer 73 is connected to the source of supply through conductors 81 which are connected across conductors 82 and 83 which are energized by the secondary winding 84 of a transformer 85 whose primary winding 86 is connected across the welding circuit supply conductors 4, 5. A filter, comprising a capacitor 87 and its parallel connected resistor 88, is connected across the control element 62 and cathode 61 of arc discharge device 36.

Electrostatic shielding is provided in the quotient computer circuit just described by providing the welding transformer 7, the signal voltage transformers 29 and 49 and the charging transformer 73 for capacitor 70 with shields 89 which are located between their primary and secondary windings and electrically connected to conductor 42 which is at ground potential. Furthermore, the envelopes and shields of diodes 53, 65, and 78 and of the electric discharge device 35 are also connected to conductor 42 which is at ground potential.

The saw-tooth voltage wave of capacitor 34 of the quotient circuit is fed through a square wave generator to a ratio control circuit which will deliver an output voltage when a predetermined ratio of two values is obtained. This ratio of values is set by an adjustment of the ratio control circuit in accordance with the desired percentage drop in resistance across the weld during a welding operation. The ratio control circuit comprises parts identified by legends on the drawings as "radio control," "memory circuit," "follower circuit," and "ratio relay." The square wave generator has also been identified by a legend on the drawing which is applied immediately below it. The square wave generator is employed to obtain a frequency signal of constant amplitude since the frequency output of the quotient computer circuit will vary in accordance with the frequency at which this circuit is oscillating.

The particular square wave generator illustrated in the drawing is an Eccles-Jordan multivibrator of the type sometimes identified as a "scale-of-two" circuit in which successive triggers from a single source induce alternate transitions between its two stable states. It is a cross coupled balanced bi-stable conduction state multivibrator having a common trigger circuit and two square wave voltage output circuits each of which is responsive to the change in state of a different side of the multivibrator. It comprises a double triode 90 having anodes 91 and 92, cathodes 93 and 94 and control elements 95 and 96. This triode may for convenience be a 6SN7GT. Its anode 91 is connected through an anode resistor 97 to direct current supply conductor 37 and its anode 92 is connected through an anode resistor 98 to this same conductor. Its cathodes 93 and 94 are connected together and to a second direct current supply conductor 99. The control elements of each half of the double triode are cross-connected to the anodes of the other half. Thus control element 95 is connected through a capacitor 100 and its parallel connected resistor 101 to anode 92 and control element 96 is connected through a capacitor 102 and its parallel connected resistor 103 to anode 91. Control element 96 is also connected to direct current supply conductor 42 through a biasing resistor 104 and control element 95 is also connected to conductor 42 through a biasing resistor 105. Each of the control elements 95 and 96 of the double triode 90 is connected through capacitors 106 and 107 to conductor 109 which is connected to the terminal of capacitor 34 which is operating at an oscillating voltage. Thus each time capacitor 34 is discharged by the arc discharge device 36, a triggering voltage is applied to the multivibrator and causes it to change its state of conduction from one anode circuit to the other of the double triode 90. In order to balance the loading of the multivibrator two output circuits 110 and 111 are connected thereto. From what has been previously stated it is quite obvious that the multivibrator operates at half the frequency of the quotient computer.

The ratio control portion of the ratio control circuit comprises two parallel connected resistor-capacitor circuits and two electric discharge devices each of which is connected across a different one of the capacitors of these circuits. One or both of the resistor and capacitor elements of one of the resistor-capacitor circuits is made adjustable in order to adjust its time constant relative to the time constant of the other resistor-capacitor circuit. The reason for this will appear as the description proceeds.

In the arrangement illustrated one of the resistor-capacitor circuits comprises a resistor 112 and an adjustable capacitor 113 connected in series with one another across direct current supply conductors 114 and 42. The other resistor capacitor circuit comprises a resistor 115 and a capacitor 116 series connected with one another across the same direct current supply conductors 114, 42. Each of the capacitors is provided with a discharge circuit comprising electric discharge devices 117 and 118. As illustrated these devices are beam tubes and may be 6L6G's. Each has an anode 119, a cathode 120, a screen grid 121 and a control grid or control element 122. The anode cathode circuit of device 117 is connected across the terminals of capacitor 113 and the anode-cathode circuit of device 118 is connected across the terminals of capacitor 116. The shield grids 121 of these devices is connected through a resistor 123 to direct current supply conductor 114. Control element 122 of device 117 is connected through a coupling capacitor 124 to output conductor 110 of the multivibrator just described and control element 122 of device 118 is connected through a coupling capacitor 125 to the other output conductor 111 of the multivibrator. The control elements 122 of devices 117 and 118 are also respectively connected to conductor 42 through bias resistors 124' and 125'. The voltage values attained across capacitors 113 and 116 as a result of each of the charging operations are respectively supplied to output conductors 126 and 127.

Output conductor 126 of the ratio control portion of the ratio control circuit completes the connection of a memory circuit which acts to retain the highest voltage attained across capacitor 113 during its charging period. Output conductor 127 of the ratio control completes the connection of a follower circuit across capacitor 116 of the ratio control. This follower circuit continually adjusts its voltage to the changing voltage to which capacitor 116 is periodically charged. When voltages of the memory circuit and of the follower circuit become equal they operate a ratio relay which supplies a control voltage to the control circuit portion of the control shown in Fig. 1c.

Output conductor 126 of the ratio control is connected through contact 128 of a transfer switch 129 to the anodes 130 of a double diode 131 having cathodes 132 which are connected to one terminal of the memory capacitor 133 whose other terminal is connected to conductor 42. The double diode 131 may be a 6H6. In order to protect the circuit therethrough against stray voltages electrostatic shielding is provided by connecting its shielding connection through conductor 134 to conductor 42 which is at ground potential.

The voltage across memory capacitor 133 is applied to the ratio relay through the agency of a cathode follower comprising an electric discharge device 135 having its anode 136 connected to direct current supply conductor 37, its cathode 137 connected through a cathode follower resistor 138 to supply conductor 42 and its control element 139 connected to the terminal of capacitor 133 which is connected to the cathodes 132 of double diode 131. Series connected resistors 140 are connected across memory capacitor 133 and in the control element circuit of electric discharge device 135 in order to avoid a so-called floating grid connection. The resistance of resistors 140 is very high so that during a welding period the charge on memory capacitor 133 remains substantially constant. Memory capacitor 133 is provided with a discharge circuit which is completed across its terminals through a resistor 141, selector switch 142 and conductors 143 which extend to the contacts of a relay in Fig. 1c which will be described later. Another selector switch 144 is provided so that memory capacitor 133 may be discharged independently of its other discharge circuit just described.

Output conductor 127 of the ratio control is connected through contact 145 of selector switch 129, conductor 146 and the anodes 147 of a double diode 148 whose cathodes 149 are connected to one terminal of a follower capacitor 150 whose other terminal is connected to direct current supply conductor 42. Double diode 148 may be a 6H6 as was double diode 131 described above. The follower capacitor 150 is shunted by a resistor 151 which is of such a value as to permit discharge of the capacitor 150 at a rate that will permit this capacitor to follow the decrease in voltages to which capacitor 116 of the ratio control portion of the ratio control circuit is being periodically charged. The voltage of follower capacitor 150 is applied to the ratio relay through a cathode follower circuit comprising an electric discharge device 152 whose anode 153 is connected to direct current supply conductor 37 and whose cathode 154 is connected through a cathode follower resistor 155 and a balancing potentiometer 156 to direct current supply conductor 42. The control element 157 of electric discharge device 152 is connected to the terminal of follower capacitor 150 which is connected to the cathodes of the double diode 148.

The voltages of memory capacitor 133 and follower capacitor 150 are employed to control the operation of a ratio relay whose output is supplied to the control element circuits of two electric discharge devices forming part of the circuits of Fig. 1c. This relay embodies an electric discharge device 158 having an anode 159, a cathode 160, a shield grid 161 and a control element or grid 162. These elements are enclosed within an envelope containing a gas or vapor as indicated by the dot associated with the cathode thereof. For example, this device may be a 2050 thyratron. The anode 159 of electric discharge device 158 is connected through a current limiting resistor 163, the contacts of a pushbutton switch 164, conductors 165 which extends to the control of Fig. 1c and the primary winding 166 of transformer 167 to one of the conductors 168 of a pair of direct current supply conductors whose other conductor 169 is connected through a potentiometer 170 and a conductor 171 to the cathode 160 of this device. A capacitor 172 is connected across the contacts of switch 164 and conductors 165 and an indicating light such as a neon glow tube 173 is connected in series with resistors 174 and 175 between the anode 159 of device 158 and the primary winding 166 of transformer 167. This latter connection is provided in order to give an indication of the conductivity of electric discharge device 158. The secondary winding 176 of transformer 167 is connected through conductors 177 to the control circuit shown in Fig. 1c.

The shield grid 161 of electric discharge device 158 of the ratio relay is connected to its cathode 160. Its control element 162 is connected through a current limiting resistor 178, conductor 179, resistor 138 of the cathode follower 135, 138, conductor 42, the balancing rheostat 156 and resistor 155 of the cathode follower 152, 155, 156, conductor 180, potentiometer 170 and conductor 171 to its cathode 160. Thus, the output voltage of cathode follower 135, 138 is matched against the output voltage of cathode follower 152, 155, 156 with the adjustable rheostat 156 being provided in order to secure the desired balance between these two voltages. The voltage obtained from potentiometer 170 is sufficient to render electric discharge device 158 conducting when the voltages derive from the memory capacitor 133 and follower capacitor 150 are substantially equal. This potentiometer 170 is connected across the direct current supply conductors 168 and 169 through a resistor 181. A smoothing capacitor 182 is connected across the terminals of potentiometer 170. Electrostatic shielding is provided for electric discharge device 158 by the grounding connection 183.

When selector switch 129 is thrown into its left-hand position calibrating connections are provided for adjusting balancing rheostat 156 and stability potentiometer 170 of the ratio relay. In its left-hand position contact 184 of switch 129 completes a circuit through resistor 185 and potentiometer 186 across supply conductors 114 and 42. The slider of potentiometer 186 is connected through contacts 128 and 145 of selector switch 129 to apply the adjustable voltage of potentiometer 186 to memory capacitor 133 and follower capacitor 150. Also contact 187 of selector switch 129 completes a circuit through conductors 188 and 189, resistor 190 and voltmeter 191 to the output conductors 180 and 179 of the cathode followers respectively associated with the follower capacitor 150 and the memory capacitor 133. A pushbutton switch 192 is provided for short circuiting resistor 190 and thus increasing the sensitivity of this circuit.

Direct current supply conductors 168 and 169 for the ratio relay are energized through a full wave rectifier comprising a double diode 193 and transformer 194 which are connected to provide a full wave rectifier which receives its energization through conductors 195, 81, 82 and transformer 85 from the alternating current supply conductors 4, 5. A filter 196 is connected across the direct current conductors 168 and 169.

The several levels of direct current supply existing between conductors 42, 99, 114 and 37 are provided by a full wave rectifier comprising a double diode 197 and a transformer 198 which receives its energization through conductors 195, 81, 82, 83 and transformer 85 from the alternating current conductors 4, 5. The output of this rectifier is filtered by a circuit including capacitors 199 and 200 and an inductance 201, and applied to the series circuit including adjustable resistor 202 and the voltage regulating devices 203, 204 and 205. Smoothing capacitors 206, 207 and 208 are respectively connected across the terminals of the voltage regulating devices 203, 204 and 205. Direct current conductors 37 and 114 are connected across voltage regulating device 203, direct current conductors 114 and 99 are connected across the terminals of voltage regulating device 204 and direct current conductors 99 and 42 are connected across the terminals of voltage regulating device 205.

The control circuits of Fig. 1c will now be described. These control circuits are supplied with alternating current excitation from conductors 82 and 83 which are connected across the secondary winding 84 of transformer 85 whose primary winding is connected across supply conductors 4, 5. Two levels of direct current supply are also provided through rectifier connections energized through transformer 209 whose primary winding 210 is connected across conductors 81 which in turn are connected across the alternating current conductors 82 and 83. One of these rectifier connections includes the secondary winding 211 of transformer 29 and the double diode 212. The output of this rectifier is filtered through an inductance 213 and a capacitor 214 and applied across direct current conductors 215 and 216 through conductors 217 and 218. Conductor 216 is grounded as has been illustrated in the drawing. The other rectifier connection includes the secondary winding 219 of transformer 209 and the double diode 220. The output of this rectifier is filtered by the parallel connected resistor 221 and capacitor 222 and applied across direct current conductors 216 and 223. Since the voltage across conductors 216 and 223 is applied in the control element circuits of several electric discharge devices, electrostatic shielding is provided for double diode 220 by a connection 224 to the grounded conductor 216. Transformer 209 is also provided with a shielding plate 225 which is also connected to the grounded conductor 216.

When the system is connected to the source of supply control functions thereof are delayed for a predetermined time in order to provide for cathode heating of the several electric discharge devices employed. This delay is imposed by operation of a filament heating time relay 226 and a control relay 227 whose operation is dependent thereon. Relay 226 is of the thermostatic type having a thermostatic switching element 228 which is heated by a winding 229 connected through normally closed contacts 230 of relay 227 across the alternating current conductors 82, 83. After the predetermined delay period, thermostatic element 228 of relay 226 closes its contacts 231 to complete the energizing circuit for winding 232 of relay 227 through conductor 233, contacts 231 of relay 226 and conductor 234 across the alternating current conductors 82, 83. When relay 227 picks up it completes its own holding circuit through its normally open contacts 235 and conductors 233 and 234.

The closure of contacts 235 of control relay 227 also completes the energizing circuit for winding 236 of a reset relay 237 through conductors 234 and 238, normally closed pushbutton switch 239 and conductor 240. This reset relay is provided with three pairs of contacts one of which is normally closed and the other two of which are normally open. Normally open contacts 241 of this relay are in circuit with conductors 165 which complete the output circuit of the ratio relay of Fig. 1b. Normally open contacts 242 of this relay connect direct current supply conductor 215 through conductors 243 to conductor 244 which controls the energization of certain relays soon to be described. Normally closed contacts 245 of relay 237 complete a circuit through conductors 246 and a resistor 247 across the operating winding 248 of output relay 23 whose normally closed contacts 22 are in the control element circuit of electric discharge devices 9 and 10 which control the supply of welding current to the welder.

The welding time is determined by the sequential operation of three relays the second of which is dependent upon the operation of the first and the third of which is dependent upon the operation of the second. These relays have been identified in Fig. 1c of the drawing by reference numerals 249, 250 and 251. Relay 249 is a monitor delay relay which prevents operation of the monitor in response to the erratic resistance variations at the weld during the period when the welding electrodes are seating themselves against the work. The delay period imposed by this relay is only of two or three cycles duration. Relay 250 is a minimum weld time relay which controls the operation of a signal relay 252 if the percentage change in resistance being monitored occurs during its period of operation. Relay 251 is a maximum weld time relay which will give one signal if the percentage change in resistance occurs during its timing period and a different signal if the percentage change in resistance occurs after its timing period. The signals referred to are provided by lamps 253, 254 and 255 which in the arrangement illustrated are respectively red, amber and green as indicated by the letters "R," "A" and "G" applied thereto.

The monitor delay relay 249 has an operating winding 256 which is connected across a timing capacitor 257 which is connected across direct current supply conductors 215, 216 through conductors 243 and normally open contacts 242 of reset relay 237, resistor 258 and the normally open contacts 259 of initiating relay 25 whose operating winding is connected across the primary 6 of the welding transformer 7 through conductors 27. Relay 249 has normally closed contacts 260 and 261 and normally open contacts 262. The normally closed contacts 260 control the discharge circuit through conductors 143 for the memory capacitor 133 of Fig. 1b. The normally closed contacts 261 are in the timing circuit of time delay relay 250. The normally open contacts 262 are connected in shunt to the normally open contacts 259 of initiating relay 25.

The minimum weld time relay 250 has an operating winding 263 which is connected across direct current conductors 215, 216 through a resistor 264 in the left-hand half of a double triode 264. This double triode may be a 6SN7GT having anodes 265 and 266, cathodes 267 and 268 and control elements 269 and 270. Its control element 269 is connected through a current limiting resistor 271 to one terminal of a timing capacitor 272 whose other terminal is connected to conductor 223 which is at a negative potential relative to conductor 216 which is connected to the cathode 267 with which control element 269 is associated. This timing capacitor 272 is provided with an adjustable discharge circuit including an adjustable resistor 273 and a fixed resistor 274. One terminal of resistor 274 is connected to conductor 223 and its other terminal, in addition to being connected to one terminal of the adjustable resistance 273, is connected through the normally closed contacts 261 of monitor delay relay 249 to the slider of a potentiometer 275 which is connected in circuit with a fixed resistor 276 across conductors 215 and 216. Thus, as will be pointed out in greater detail below minimum time relay 250 will be normally picked up and will start to time out upon pick up of monitor delay relay 249.

Minimum weld time relay 250 has normally open contacts 277 and 278 and normally closed contacts 279. Normally open contacts 277 complete when closed a circuit between conductors 280 and 281 which are in the control element circuit of electric discharge device 282 which controls the energization of signal relay 252. Normally closed contacts 279 of relay 250 complete a short circuit about resistor 283 which is connected between the operating winding 248 of output relay 23 and electric discharge device 284 which controls the energization of this winding. The short circuit about resistor 283 is completed through conductor 285, 286 and one of the conductors 246. Normally open contact 278 of minimum weld time relay 250 is connected in the timing circuit which controls conduction of the right-hand half of the double triode 264 whose anode-cathode conduction controls the operation of maximum weld time relay 251.

Maximum weld time relay 251 is provided with an operating winding 287 which is connected in circuit with a resistor 288 and the anode-cathode circuit of the right-hand half of double triode 264 across direct current conductors 215, 216. The cathode 268 of this half of the double triode 264 is connected to direct current conductor 216 and its control element 270 is connected through a current limiting resistor 289 to one terminal of a timing capacitor 290, whose other terminal is connected to direct current conductor 223. A discharge circuit is provided for capacitor 290 through the adjustable rheostat 291 and the fixed resistor 292. One terminal of this resistor 292 is connected to conductor 223 and its other terminal, in addition to being connected to one of the terminals of the rheostat 291, is connected through the normally open contacts 278 of the minimum time relay 250 to the adjustable slider of potentiometer 293 which is connected in series with resistor 294 across the direct current supply conductors 215, 216. Thus, when the minimum time delay relay 250 drops out, it initiates the timing of maximum weld time relay 251 which after its delay period will also drop out unless the connection of timing capacitor 290 is again established to the slider of potentiometer 293.

The maximum weld time relay 251 is provided with normally open contacts 295 and 296 and normally closed contacts 297 and 298. Normally open contacts 295, when closed, complete a circuit in shunt to contacts 278 of the minimum time delay relay 250, through conductor 299, the normally open contacts 300 of output relay 23 and conductor 300, assuming of course that the normally open contacts 300 of output relay 23 are also closed. Normally closed contacts 297 of relay 251 complete a circuit through conductors 216, 301 and 302 and current limiting resistor 303 between the control element 304 and the cathode 305 of electric discharge device 284. Normally closed contacts 298 of relay 251 complete a connection of the green signal light 255 across the alternating current conductors 82 and 83 through conductors 306, 307, the normally closed contacts 308 of signal relay 252 and conductor 309. The normally open contacts 296 of relay 251 complete, when closed, the energizing circuit for the amber signal light 254 across conductors 82 and 83 through conductors 310 and 307, the normally closed contacts 308 of signal relay 252 and conductor 309.

Signal relay 252 has an operating winding 311 which is shunted by a resistor 312 and connected in series with a resistor 313 and the anode-cathode circuit of electric discharge device 282 across the direct current conductors 244 and 216. The electric discharge device 282 has an anode 314, a cathode 315 and a control element 316. As indicated by the dot associated with its cathode 215, this device is of the gaseous type and may be a thyratron. Its cathode 315 is connected to conductor 216 and its control element 316 is connected through current limiting resistors 317 and 318 to direct current conductor 223 and through resistor 317, conductor 281, the normally open contacts 277 of the minimum weld time relay 250, conductor 280 and capacitor 319 to the slider of potentiometer 320 which is connected in the output circuit of the ratio relay shown in Fig. 1b. In addition to its normally closed contacts 308, signal relay 252 also has normally open contacts 321 which control the energization of the red signal light 253. When contacts 321 of signal relay 252 are closed they complete the energizing circuit for the red signal light 253 from conductors 82 and 83 through conductors 322 and 309.

Electric discharge device 284 controls the energization of output relay 23 subject to the shorting connection through conductors 246 about its operating winding 248 and the magnitude of current flow to this winding determined by the presence or absence of resistor 283 which is connected between its anode 323 and one terminal of its winding 248. As indicated by the dot associated with its cathode 304, this device is of the gaseous type and may be a thyratron. Its control element 304 is connected through a current limiting resistor 324 and capacitor 319 to the slider of potentiometer 320, one terminal of which is connected through conductor 216 to its cathode 305. Its control element 304 is also connected through resistors 324 and 325 to conductor 223 which is a negative potential relative to conductor 216 which is connected to its cathode 305. Its control element 304 is also connected through a circuit previously traced which includes resistor 304, conductor 302, normally closed contacts 297 of the maximum weld time relay 251 and conductors 301 and 216 to its cathode 305.

It will be noted that electrostatic shielding is provided for electric discharge devices 282 and 284 by connecting its shielding connections to conductor 216 which is at ground potential. Transient suppressing capacitors 326 are provided between the control elements and cathodes of electric discharge devices 282 and 284. It will be also noted by referring to Fig. 1b that a similar capacitor 326 has been provided between the control element and cathode of electric discharge device 158 of the ratio relay.

In order to simplify the diagram of connections just described the heating circuits for the cathodes of the various electric discharge devices have not been illustrated. The same has been true for those devices in which the heating element constitutes the cathode. It will be understood that conventional arrangements will be provided for energizing these heating circuits from the supply conductors 4, 5 or from some other suitable source.

Before considering the operation of the weld monitor and control just described, further consideration will now be given to my use of a relaxation oscillator as a quotient circuit. Thereafter further consideration will be given to the operation of the ratio control circuit. In each instance a description will be given with regard to certain equations which justify my use of these circuits in the weld monitor.

In considering the use of a relaxation oscillator as a quotient circuit, reference will be made to the following equations:

(1) $$e_p = E_d \left(1 - \epsilon^{-\frac{t}{RC}}\right)$$

(2) $$\epsilon^{-\frac{t}{RC}} = 1 - \frac{t}{RC} \text{ for } t \ll RC$$

(3) $$e_p = \frac{E_d}{RC} \cdot t$$

(4) $$(E_{br} - E_{ex}) = \frac{E_d}{RC} T$$

(5) $$f = \frac{1}{T}$$

(6) $$f = \frac{E_d}{E_{br} - E_{ex}} \cdot \frac{1}{RC}$$

(7) $$E_{br} = mE_g$$

(8) $$E_g = V_g + E_c$$

(9) $$E_{br} = mV_g + mE_c$$

(10) $$f = \frac{E_d}{mV_g + mE_c - E_{ex}} \cdot \frac{1}{RC}$$

(11) $$E_c = \frac{E_{ex}}{m}$$

(12) $$f = \frac{E_d}{V_g} \cdot \frac{1}{mRC}$$

(13) $$E_d = IR_x$$

(14) $$V_g = IR_s$$

(15) $$f = \frac{IR_x}{IR_s} = CONST \cdot R_x$$

Figure 2:
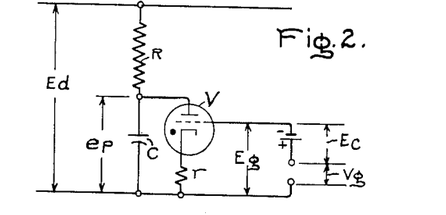
Fig. 2 is a diagrammatic representation of the basic quotient circuit, a modification of which is embodied in my control as illustrated in Fig. 1a, Fig. 3 is a graph illustrating the increase with the lapse of time of the voltage of a capacitor such as employed in the computer circuit of Fig. 1a and Fig. 2.
Figure 3:
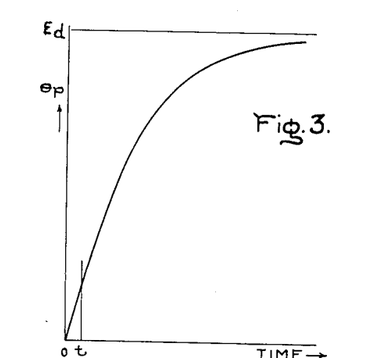

Fig. 2 of the drawings shows a relaxation oscillator which forms part of my quotient circuit. Suppose the grid voltage $E_g$ of Fig. 2 is sufficiently negative to prevent conduction of thyratron V when its plate voltage $e_p$ reaches the direct current supply voltage $E_d$. Then the plate voltage $e_p$ will increase with time as shown by Equation 1 above and Fig. 3 of the drawings, provided the capacitor voltage was zero at time $t=0$. If $t$ is small in comparison with RC, the exponential term in Equation 1 can be approximated by the linear term of Equation 2 and the plate voltage increases linearly with time according to Equation 3.

Figure 4:
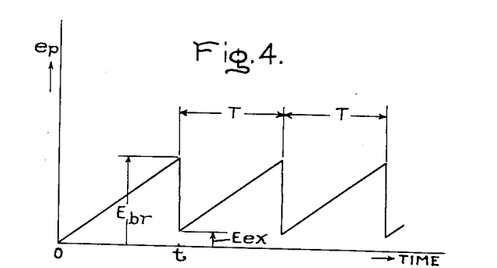
Fig. 4 is another graph illustrating the sawtooth wave of voltage variation with lapse of time that occurs across the capacitor of a computing circuit such as shown in Fig. 1a and Fig. 2.

If the grid voltage $E_g$ (Fig. 2) is adjusted to cause thyratron V to break down at $E_{br}$ volts, capacitor C will discharge through thyratron V when $e_p$ reaches $E_{br}$. The resistor r serves to limit the plate current of thyratron V. Thyratron V, however, cannot completely discharge capacitor C because its conduction stops when its plate-cathode potential falls below its extinction voltage $E_{ex}$ (Fig. 4). Hence, a residual voltage will remain across the terminals of capacitor C at the start of the consecutive charging cycle. Again, the plate voltage $e_p$ will break down after reaching the value $E_{br}$ and the process repeats itself. The maximum voltage span which $e_p$ covers equals $E_{br} - E_{ex}$, leading to Equation 4. Since the repetition frequency $f$ is the reciprocal of the length of period T (Equation 5) the frequency $f$ can be expressed as shown in Equation 6.

Thyratron V has a breakdown voltage $E_{br}$ which is proportional to the negative grid voltage $E_g$, and consequently Equation 7 can be realized where $m$ is a constant of negative sign. Moreover, the grid voltage can be considered as the sum of two voltages $V_g + E_c$ (Equation 8). Substituting $E_g$ from Equations 8 and 7, Equation 9 is obtained. Taking $E_{br}$ from Equation 9 and applying it to Equation 6, an expression for the frequency results (Equation 10). If the bias voltage $E_c$ is adjusted to meet the condition of Equation 11, the frequency $f$ becomes a function only of $E_d$ and $V_g$ (Equation 12).

Figure 5:
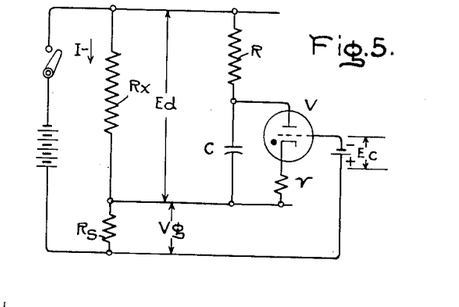
Fig. 5 is a representation of the manner in which the computing circuit of Fig. 2 may be employed for measuring resistance.

It should be noted that this circuit computes a quotient of two quantities $E_d$ and $V_g$. While this circuit may be applied to the special case under consideration to measure a resistance which is a quotient of the voltage across a resistor divided by the current through the resistor, the circuit is a basic computer circuit and may be applied to a variety of applications. One simple form applied to the measurement of resistance is shown in Fig. 5. An unknown resistor $R_x$ is energized from a direct current source as shown in the drawing. The circuit of Fig. 2 is connected to the unknown resistor as shown in Fig. 5 and the voltage $E_d$ is obtained across $R_x$ in accordance with Equation 13. The voltage $V_g$ is obtained across a meter shunt $R_s$ (Equation 14). Substituting Equations 5, 13 and 14 in Equation 12, one obtains for the resistance $R_x$ the Equation 15.

Instead of making the frequency $f$ proportional to the resistance of the weld, the frequency can also be made proportional to its conductance by making $E_d$ proportional to the current through the weld, and $V_g$ proportional to the voltage across the weld. This is the arrangement that has been illustrated in Fig. 1a above described. In some instances it may be a disadvantage if one of the input circuits, as in Fig. 5 above, has also to provide the circuit with the electrical power to drive it. Consequently, the variation of the circuit shown in Fig. 1a of the drawings was devised which required power only for the energization of the grids of two electronic tubes. If the plate current $I_p$ through the pentode 35 of Fig. 1a stays constant, the plate voltage $e_p$ (Fig. 4) as a function of time, will again be a straight line and provide the equation $$e_p = \frac{I_p}{C} t$$

In analogy to Equation 12 the frequency $$f = \frac{I_p}{V_g} \cdot \frac{1}{mC}$$

If the plate current $I_p$ is proportional to the voltage of the control grid of the pentode, then the frequency $f$ is again the quotient of two voltages similar to Equation 12. Instead of voltage $E_d$, the control voltage of the pentode enters into the equation and of course the constant term will be different. In order to obtain better linearity between control grid voltage of the pentode and its plate current, the degenerative resistor 40 of Fig. 1a is employed.

The quotient circuit of Fig. 1a of the drawings supplies a signal frequency which is proportional to the conductivity of the weld. That is, the duration T of the period of the signal frequency is proportional to the resistance of the weld. The frequency signal of the quotient circuit is transformed into a square wave by the square wave generator shown whose output frequency is one half of its input frequency. One square wave output voltage is applied between the control element 122 and the cathode 120 of the electric discharge device 117 and the other square wave output voltage is applied between the control element 122 and cathode 120 of electric discharge device 118. The effect of these square wave control voltages on the charging and discharging of capacitors 113 and 116 of the resistor-capacitor circuits 112, 113 and 115, 116, will now be considered with regard to the following equations:

(1) $$e_1 = E(1 - \epsilon^{-T/\tau_1}) + E_0$$

(2) $$e_2 = E(1 - \epsilon^{-T/\tau_2}) + E_0$$

for $R = R_{max}$ $T = T_{max}$ (3) $$e_1/T_{max} = E(1 - \epsilon^{-T_{max}/\tau_1}) + E_0$$

for $e_2 = e_1/T_{max}$ (4) $$E(1 - \epsilon^{-T_2/\tau_2}) + E_0 = E(1 - \epsilon^{-T_{max}/\tau_1}) + E_0$$

(5) $$\therefore \frac{T_3}{T_{max}} = \frac{\tau_2}{\tau_1}$$

(6) $$T_3 = K R_3$$

(7) $$\frac{R_s}{R_{max}} = \frac{\tau_2}{\tau_1}$$

Figure 6:
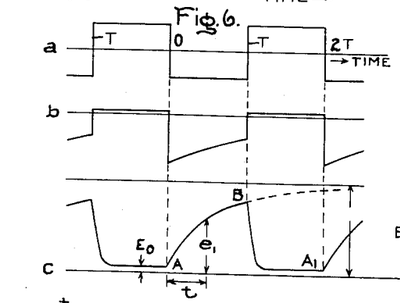
Fig. 6 is a voltage diagram illustrating the operation of the ratio control circuits illustrated in Fig. 1b of the drawings.
Figure 7:
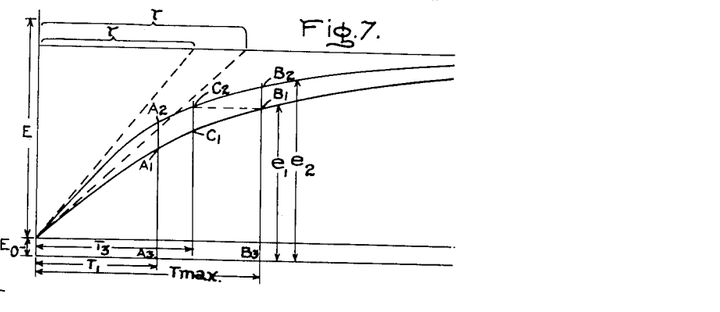
Fig. 7 is a further diagrammatic representation with regard to voltage conditions in these ratio control circuits.

For operation of the ratio control portion of the ratio control circuit of the monitor reference should also be made to Fig. 6 and Fig. 7 of the accompanying drawings. The voltage relationships of Fig. 6 apply equally well to electric discharge device 117 and capacitor 113 or electric discharge device 118 and capacitor 116. When the square wave voltage of Fig. 6a is applied between the control element 122 and cathode 120 of electric discharge device 117, due to grid rectification, the grid voltage of Fig. 6b will be near zero from T to 0 and from T to 2T, turning on electric discharge device 117 whereas between 0 and T the grid voltage is sufficiently negative to cut off electric discharge device 117. During the conduction period of electric discharge device 117, the plate-cathode voltage $e_1$ of Fig. 6c assumes the value of $E_0$ of a few volts. When electric discharge device 117 is cut off at point A, capacitor 113 is charged up exponentially in accordance with Equation 1 above wherein E is the plate supply voltage and $\tau$ is the time constant of 112-113 and equals the resistance in ohms of resistor 112 multiplied by the capacitance in farads of capacitor 113. Eventually voltage $e_1$ reaches point B when electric discharge device 117 becomes conducting, resulting in a discharge of capacitor 113. At point $A_1$ the cycle repeats itself. If, for instance, the weld resistance is increasing the duration T of the cycle is also increasing, and the peak value of $e_1$ will also increase and vice versa. Considerations thus given will apply equally well to the electric discharge device 118 and capacitor 116 of the other resistor-capacitor circuit of the ratio control.

Referring now to Fig. 7 it will be noted that if square waves of $T_1$ duration are applied to electric discharge devices 117 and 118, the peak voltage across capacitor 113 is $A_1A_3$ whereas the peak voltage across capacitor 116 is $A_2A_3$ which is in accordance with Equations 1 and 2 given above. As the weld resistance rises, the voltage across capacitors 113 and 116 also rises and for maximum weld resistance $R_{max}$ the duration $T_{max}$ also becomes a maximum resulting in a maximum peak voltage of $B_1B_3$ (Equation 3 above) on capacitor 113 and a maximum peak voltage of $B_2B_3$ on capacitor 116. The maximum voltage of capacitor 113 will be trapped and held on the memory capacitor 133 of the memory circuit by reason of the circuits previously described whereas the voltage across capacitor 116 will be followed by the follower capacitor 150 of the follower circuit also previously described.

Now assume that the weld resistance decreases in which case the voltage of capacitor 116 will decrease along the curve $e_2$ from $B_2$ toward $C_2$. The memory capacitor 133 however will remain charged up to the $B_1B_3$ value. Finally, the weld resistance will decrease until the point $C_2$ is arrived at when the ratio relay will operate to apply an output signal into the control circuits of Fig. 1c. It can be seen from Equations 5, 6 and 7 above that at this instant of equality, the percentage resistance drop is solely a function of the two time constants $\tau_1$ and $\tau_2$.

It thus becomes apparent how the ratio control circuit gives a signal upon the attainment of a predetermined percentage drop in the maximum value of resistance and how this percentage drop value can be adjusted by adjusting the time constants of the two resistor-capacitor circuits of the ratio control portion of the ratio control circuit. In order to vary the percentage resistance drop, it is only necessary to vary one of the two time constants. In the arrangement illustrated provision has been made for this by making capacitor 113 an adjustable capacitor.

Figure 9:
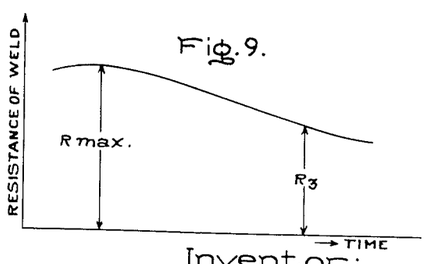
Fig. 9 is a graph illustrating a typical change in resistance across a weld during its formation.

In Fig. 9 of the drawings I have illustrated a graph of the typical resistance change of a resistance weld with the lapse of time and I have indicated thereon the $R_{max}$ and the $R_3$ values previously considered above in connection with Fig. 7.

The operation of the resistance welding monitor and control shown in Figs. 1a, 1b and 1c will now be described.

It will be assumed that the voltage pickup compensator 33 has been properly adjusted in the throat of the welder to compensate for voltages induced in the leads 31 and 32 connected to the welding electrodes 12 so that the voltage applied to the primary 30 of voltage transformer 29 will be a true indication of the voltage existing across the weld between the electrodes 12. It will also be assumed that by means of rheostat 56 the voltage output of the secondary winding 50 of transformer 49 whose primary winding 48 is energized by the current transformer 28 and that by means of winding taps, not shown, the output voltage at the primary winding 48 of transformer 49 will have been adjusted in accordance with the magnitude of the welding current employed and the voltage drop across the work through which this welding current flows. The frequency range of the relaxation oscillator 34, 35, 36 will also have been adjusted by an adjustment of rheostat 41 which applies, in accordance with its setting, a predetermined cathode bias to electric discharge device 35. The ripple of filter 87, 88 connected across the control element and cathode of arc discharge device 36 will have been matched by the ripple of filter circuit 57, 58 connected across the control element and cathode of electric discharge device 35 by an adjustment of rheostat 59. Also, the voltage values across the memory capacitor 133 and the follower capacitor 150, as evidenced in the cathode follower circuits associated therewith, will have been adjusted for equality by a proper setting of balance rheostat 156. At the same time stability potentiometer 170 will have been set so that when the voltage outputs of the cathode follower circuits associated with the memory capacitor 133 and the follower capacitor 150 are equal, electric discharge device 158 of the ratio relay will become conducting. These latter adjustments are made with the transfer switch 129 in its left-hand position. The minimum weld time and the maximum weld time are also determined by an adjustment of timing rheostats 273 and 291, respectively, associated with the timing relays 250 and 251.

When the line switch 3 is closed, alternating current is supplied to conductors 4 and 5 from the supply conductors 1 and 2 which are connected to a suitable source of alternating current. The energization of conductors 4 and 5 results in the energization of transformer 85 which consequently energizes conductors 82 and 83 which provide excitation for the alternating current control circuits energized from conductors 82 and 83 and also provides direct current energization of conductors 215, 216 and 223 which are supplied through conductors 81, transformer 209 and rectifiers 212 and 220. Energization of conductors 82 and 83 also supplies through conductors 81 and 195 three levels of direct current voltage between conductors 37, 114, 99 and 42 of the weld monitor through transformer 198 and rectifier 197 and direct current energization of conductors 168 and 169 through transformer 194 and rectifier 193. Energization is also supplied from conductors 82 and 83 through conductors 81 to transformer 73 which through rectifier 78 applies an adjustable voltage across capacitor 70 connected in the control element-to-cathode circuit of arc discharge device 36. This adjustable voltage is equal to the value $E_c$ referred to in the equations above given for the relaxation oscillator circuit. As stated above, the various heated cathodes and cathode heaters of the several electric discharge devices are energized through circuits not shown upon the closure of line switch 3 and the application of alternating current to the conductors 4, 5.

At the time line switch 3 is closed contacts 231 of the filament heating timer 226 are open and as a consequence control relay 227 is in the position illustrated as is reset relay 237. The monitor delay relay 249 is in the position illustrated since its energizing circuit is open not only at contacts 242 of reset relay 237 but also at contacts 259 of initiating relay 25. Minimum time delay relay 250 is picked up because the left-hand half of double triode 264 has been rendered conducting for reason of the fact that its control element 269 is connected through resistor 271, rheostat 273 and the closed contacts 261 of monitor delay relay 249 to the slider of potentiometer 275 which is at a positive potential relative to the cathode 267 thereof which is connected to conductor 216. The pickup of minimum weld delay relay 250 causes maximum weld delay relay 251 to pick up due to the right hand part of double triode 264 becoming conducting by reason of the connection of its control element 270 through resistor 289, rheostat 291 and the now closed contacts 278 of relay 250 to the slider of potentiometer 293 which is at a positive potential relative to conductor 216 to which its associated cathode 268 is connected. Signal relay 252 is in the position illustrated in the drawing by reason of the fact that conductor 244 is disconnected from conductor 215 by the open contacts 242 of reset relay 273. Output relay 23 is also in the position illustrated not only due to the short circuiting of its operating winding 248 through contacts 245 of reset relay 237 but also due to the fact that conductor 244 is disconnected from conductor 215 at the contacts 242 of this reset relay.

Upon the energization of conductors 82 and 83 the heating winding 229 of relay 226 is energized through the normally closed contacts 230 of control relay 227. After the time delay imposed by this relay 226, it closes its contacts 231 and thus energizes the operating winding 232 of control relay 227 through a circuit including conductor 233, operating winding 232, contacts 231 of relay 226 and conductor 234. Pick up of control relay 227 completes its own holding circuit through its contacts 235 and at the same time opens the circuit through the heating winding 229 of relay 226 at its contacts 230. Pick up of control relay 227 also energizes the operating winding 236 of reset relay 237 through a circuit extending through conductor 240, winding 236, reset switch 239, conductor 238, contacts 235 of relay 227 and conductor 234.

Pick up of reset relay 237 closes its contacts 241 which connects the primary winding 166 of transformer 167 of the ratio relay of Fig. 1b in circuit with pushbutton switch 164, resistor 163, the anode-cathode circuit of electric discharge device 158 and the lower portion of the sensitivity potentiometer 170 across direct current supply conductors 168 and 169 for this ratio relay. Pick up of reset relay 237 also closes its contacts 242 which connects direct current supply conductor 215 to conductor 244 which supplies energization to the signal relay 252 and the output relay 23. Pick up of reset relay 237 also opens the circuit at its contacts 245 through conductors 246 which are connected in shunt to resistor 247 and the operating winding 248 of output relay 23.

A welding operation is initiated by closing pushbutton switch 20 in the control element circuit of electric discharge devices 9 and 10 which are reversely connected in parallel with one another in the supply circuit of the primary winding 6 of welding transformer 7. The closure of switch 20 completes the control element circuit of whichever of the electric discharge devices 9 and 10 has applied thereto a positive anode voltage. The circuit extends through rectifier 17, conductor 19, switch 20, conductor 21, contacts 22 of relay 23, conductor 24 and rectifier 18 to the cathode 15 and to the negative polarity voltage applied to its cathode. Upon the flow of welding current, the voltage applied to the primary winding 6 of the welding transformer is supplied through conductors 27 to winding 26 of initiating relay 25 causing this relay to pickup and close its contacts 259. At the same time the voltage transformer 29 of the monitor and the current transformer 28 thereof are energized in accordance with the voltage across the weld and the current flow through it. The weld monitor, however, is not sensitive to these voltages, insofar as producing an output signal is concerned, until weld delay relay 249 picks up. So long as the weld delay relay 249 is in the position illustrated in Fig. 1c of the drawing a discharge circuit is completed around memory capacitor 133 and the voltage relationships in the control element-to-cathode circuit of electric discharge device 158 of the ratio relay are such that this device does not become conducting because the voltage across the memory capacitor cannot become greater than the voltage across the follower capacitor due to the discharge circuit connected across the terminals of the memory capacitor.

Within two or three cycles after the closure of contacts 259 of initiating relay 25, the monitor delay relay 249 will pick up. Its timing period is determined by capacitor 257 and its charging circuit through resistor 258 which is completed from conductor 215 through conductors 243, contacts 242 of reset relay 237 and contacts 259 of initiating relay 25 to conductor 216. Upon pickup of weld monitor delay relay 249, it opens its contacts 260 to thereby open the discharge circuit about memory capacitor 133. By reason of this switching operation the weld monitor is now responsive to the resistance changes occurring across the weld. During the first two or three cycles of a weld, resistance changes across the weld are erratic, due it is believed to the changing resistance conditions between the electrodes and the work. By incapacitating the monitor for these two or three cycles, faulty operation of the monitor is eliminated.

Pick up of weld monitor delay relay 249 also opens its contacts 261 which starts the timing period for the minimum weld time relay 250 by permitting its timing capacitor 272 to discharge through rheostat 273 and resistor 274. Pick up of monitor delay relay 249 also closes its contacts 262 to complete a holding circuit about contacts 259 of initiating relay 25. Thus, relay 249 will stay picked up until reset relay 237 is deenergized by operating reset switch 239 to cause reset relay 237 to drop out and open its contacts 241 which complete the energizing circuit for monitor delay relay 249 from conductor 215.

Minimum weld time relay 250 remains picked up for a time period determined by the adjustment of its rheostat 273 which controls the discharge rate of its timing capacitor 272. During the minimum weld time period it completes circuits through its contacts 277 and 278 and opens a circuit through its contacts 279. The closure of its contacts 277 completes a control element circuit for electric discharge device 282 which renders it sensitive to the output impulse of the ratio relay of the weld monitor which impulse is supplied through conductors 177 and appears as a voltage across the sensitivity potentiometer 320. This control element circuit is completed from control element 316 of electric discharge device 282 through resistor 317, conductor 281, contacts 277 of relay 250, conductor 280, blocking capacitor 319, the slider of potentiometer 320, and the lower portion of this potentiometer to conductor 216 which is connected to the cathode 315 of electric discharge device 282. Consequently if the ratio relay of the monitor sends out an impulse during the time that contacts 277 are closed, electric discharge device 282 will be rendered conducting and consequently energized the signal relay 252 through a circuit extending from conductor 215, conductors 243 and the closed contacts 241 of reset relay 237, conductor 244, winding 311 of relay 252, resistor 313 and the anode cathode circuit of electric discharge device 282 to conductor 216. Pick up of relay 252 when thus energized completes a circuit through its normally open contacts 321 which will energize the red signal light 253. The circuit through signal light 253 extends from conductor 82 through the red signal light 253, conductor 322, contacts 321 of relay 252 and conductor 309 to conductor 83. Thus the occurrence of an output signal from the monitor during the minimum weld time will give a red signal light indication of its occurrence.

During the minimum weld time period contacts 279 of relay 250 are open. This results in the insertion of the current limiting resistor 283 in the anode-cathode circuit of electric discharge device 284 which controls the energization of the winding 248 for output relay 23. Consequently when the current impulse occurred across potentiometer 320 and rendered electric discharge device 282 conducting electric discharge device 284 was also rendered conducting but the amount of anode current supplied through it to the operating winding 248 of output relay 23 was insufficient to cause this relay to pick up. Responsiveness of electric discharge device 284 to the impulse across potentiometer 320 is secured through the connection of its control element 304 through resistor 324, blocking capacitor 319 and the lower portion of the potentiometer 320 to conductor 216 which is connected to the cathode 305 of electric discharge device 284.

So long as minimum weld time relay 250 stays picked up it completes a circuit through its contacts 278 which maintains the energization of the maximum weld time relay 251 which only begins to time out when relay 250 drops out and opens its contacts 278. Minimum weld time relay 250 will drop out after the time delay determined by the discharge of its timing capacitor 272 through the adjustable rheostat 273. After a time interval determined by the adjustment of rheostat 273, the control element 269 of the left-hand half of the double triode 264 becomes negative relative to its cathode 267 and stops the flow of current between its anode 265 and cathode 267. This results in a deenergization of the operating winding 263 of relay 250 which is completed from conductor 215 through winding 263, resistor 264 and the anode-cathode circuit 265, 267 of electric discharge device 264 to conductor 216.

When the minimum weld time relay 250 drops out, it open its contacts 277 so that electric discharge device 282 is no longer responsive to the surge voltage occurring across potentiometer 320 in the output circuit of the ratio relay of the weld monitor. This electric discharge device 282 is now biased off by the connection of its control element 316 through resistors 317 and 318 to conductor 223 which is at a negative potential relative to conductor 216 which is connected to its cathode 315.

Drop out of relay 250 also completes a circuit through its contacts 279 which short circuits resistor 283 which limits the anode-cathode current of electric discharge device 284 to a value insufficient to operate relay 23 by excitation of its operating winding 248. Consequently, output relay 23 will now be responsive to anode-cathode conduction of electric discharge device 284. Drop out of minimum weld time relay 250 also opens its contacts 278 which initiates the timing period for the maximum weld time relay 251, by permitting timing capacitor 290 of relay 251 to begin its discharge period through rheostat 291 and resistor 292.

If the ratio relay of the weld monitor now supplies an impulse which produces a voltage across potentiometer 320 during the period when minimum weld time relay 250 is dropped out and maximum weld time relay 251 is picked up, electric discharge device 284 will become conducting and cause output relay 23 to pick up closing its contacts 300 and opening its contacts 22. As previously stated, electric discharge device 284 is responsive to such impulse across potentiometer 320 by reason of the fact that its control element 304 is connected through resistor 324 and blocking capacitor 319 across potentiometer 320 to conductor 316 which is connected to the cathode 304 of device 284. The opening of contacts 22 of output relay 23 opens the control element circuit of the main electric discharge devices 9 and 10 which control the flow of welding current to the welding transformer. Consequently, the welding transformer is deenergized upon the occurrence of this pulse across potentiometer 320 during the period when relay 250 is down and relay 251 is up. Closure of contacts 300 of output relay 23 completes a circuit which prevents relay 251 from dropping out. This circuit extends from the slider of potentiometer 293 through conductor 300', contacts 300 of relay 23, conductor 299 and contacts 295 of relay 251 to resistor 292 and thence to conductor 223. This applies a potential to the control element 270 of the right-hand half of double triode 264 which maintains this half of the double triode conducting and the consequent maintained energization of the operating winding 278 of relay 251. The amber light 254 remains lighted to indicate this condition. The circuit through amber light 254 extends from conductor 82 through light 254, conductor 310, contacts 296 of relay 251, contacts 308 of signal relay 252 and conductor 309 to conductor 83.

After the time delay imposed by adjustable rheostat 291 and resistor 292, timing capacitor 290 for maximum weld time relay 251 will discharge to a value such that control element 270 of the right-hand half of the double triode 264 becomes negative with respect to its cathode 268. This will interrupt the flow of current to the operating winding 287 of relay 251 causing it to drop out. When relay 251 drops out, it completes a circuit through its contacts 297 which renders electric discharge device 284 conducting to operate output relay 23 which thereupon opens its contacts 22 to stop the flow of welding current as previously described. Electric discharge device 284 becomes conducting since its control element 304 is connected through resistor 303, conductor 302, contacts 297 of relay 251 and conductors 301 and 216 to the cathode 305 of this device. Upon drop out of relay 251, it also completes a circuit through its contacts 298 which causes the green signal light 255 to become illuminated through the following circuit; from conductor 82 through green light 255, conductor 306, contacts 298 of relay 251, conductor 307, contacts 308 of signal relay 252 and conductors 309 to conductor 83.

After each welding operation, the weld monitor and control is reset by depressing the reset switch 239 which deenergizes the reset relay 237. When this relay drops out, it opens the anode cathode circuit of electric discharge device 158 of the ratio relay thereby rendering it non-conducting and ready for another operation upon reclosure of contacts 241 with the subsequent pick up of reset relay 237 when the reset switch 239 is again closed. Drop out of reset relay 237 also opens its contacts 242 which disconnects conductor 244 from conductor 215. This will cause the monitor delay relay 249 to drop out as well as the signal relay 252 and the output relay 23. The output relay 23 also has its operating winding 248 short circuited through the contacts 245 of the reset relay when this reset relay drops out. When the reset switch 239 is again allowed to close, reset relay 237 will again pick up completing the circuits previously described in preparing the system for operation again in response to another output signal from the ratio relay of the weld monitor.

The operation of the weld monitor will now be described.

Upon the flow of welding current through conductor 8 connected in circuit with the primary winding 6 of the welding transformer 7, an output proportional to the magnitude of this current flow is applied by current transformer 28 through transformer 49 and rectifier 53 across the control element 47 and cathode 39 of the pentode electric discharge device 35. Device 35 will consequently become conducting supplying anode current in accordance with the magnitude of its control voltage to charge capacitor 34 of the relaxation oscillator. At the same time, the voltage drop across the electrodes 12 which engage the work applies a voltage through voltage transformer 29 and rectifier 65 which is added to the negative bias voltage of capacitor 70 to establish the negative bias voltage between control element 62 and cathode 61 of arc discharge device 36. The voltage to which capacitor 34 of the relaxation oscillator is charged depends upon the breakdown voltage of arc discharge device 36 and the rate at which charging current is supplied thereto through electric discharge device 35. It will thus be seen that the frequency of oscillation of the relaxation oscillator will vary directly with the current and inversely with the voltage at the weld between electrodes 12 of the welding machine. Further description of the operation of the quotient computer is believed to be unnecessary in view of the detailed description given above with regard to the operation of a suitable controlled relaxation oscillator as a quotient circuit.

The saw-tooth voltage wave of capacitor 34 is applied through conductor 109 to the square wave generator which produces a square wave voltage output which is applied through conductors 110 and 111 to control elements 122 of electric discharge devices 117 and 118 of the ratio control portion of the ratio control circuit. The alternate conduction of these electric discharge devices 117 and 118 determines the magnitude of voltage built up across capacitors 113 and 116 as has been described above in detail.

The maximum voltage appearing across adjustable capacitor 113 is retained across memory capacitor 133 of the memory circuit of the monitor. Capacitor 113 is connected to this memory capacitor through conductor 126, contacts 128 of selector switch 129, rectifier 131 and conductor 42. At the same time the voltage across capacitor 116 is followed by the voltage across follower capacitor 150 of the follower circuit of the monitor by connections completed through conductor 127, contact 145 of selector switch 129, conductor 146, rectifier 148 and conductor 142 by which it is connected across capacitor 116. As previously stated, the time constant of the resistor capacitor circuit 112, 113 is greater than that of the resistor capacitor circuit 115, 116. Consequently, the voltage of the memory capacitor 133 is at a lower potential than the follower capacitor 150 at the time when the resistance of the weld is at its maximum. As the welding resistance decreases, however, the voltage of follower capacitor 150 eventually becomes equal to the voltage of the memory capacitor 133 which is determinative of the ratio of resistance values that will give the desired percentage drop in resistance across the weld. When this occurs, electric discharge device 158 of the ratio relay becomes conducting and supplies through transformer 167 a control impulse which operates the relays of Fig. 1c in accordance with the various sequences above described. The control element circuit of electric discharge device 158 extends from its control element 162 through resistor 178, conductor 179, cathode resistor 138 of the cathode follower 135, 138 associated with memory capacitor 133, conductor 42, rheostat 156 and cathode resistor 155 of the cathode follower 152, 155, 156 associated with the follower capacitor 150, conductor 180, the lower portion of stability potentiometer 170 and conductor 171 to the cathode 160 of this device.

It will thus be seen that I have provided a resistance weld monitor and control that operates in response to percentage change in resistance across the weld being made by a resistance welding machine. If the percentage change in resistance occurs during a minimum weld period established by relay 250, a red signal light gives an indication thereof, if the signal occurs during a maximum weld period determined by the additional timing of relay 251, an amber signal light gives an indication thereof, and if the maximum weld period elapses before a signal is obtained from the monitor, the illumination of a green signal light gives an indication of this occurrence.

The quotient circuit shown in Fig. 1a of the drawings shows the cathode 61 of the arc discharge device 36 connected to a high impedance circuit consisting of electric discharge device 35 and its degenerative resistor 40. This high impedance makes arc discharge device 36 and especially its control element circuit susceptible to pickup voltages, for instance, through the winding capacity of transformer 29. Such pickup voltages cause amplitude and frequency modulation in the oscillator section of the quotient circuit unless suitable electrostatic shielding is provided as has been indicated in Fig. 1a. It will be also noted that the two input signals to arc discharge device 36 and electric discharge device 35 must be electrically separated one from the other. I have shown in Fig. 8 another quotient circuit in which these features, which may be undesirable at times, are eliminated.

Figure 8:
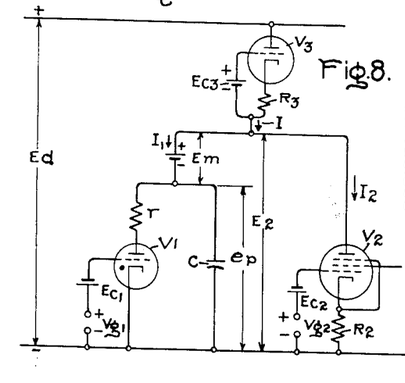
Fig. 8 is a modification of the quotient circuit shown in Fibs. 1b, 2, and 5.

In Fig. 8, pentode V2 and degenerative resistor R2 respectively correspond to electric discharge device 35 and degenerative resistor 40 of Fig. 1a. Capacitor C, which corresponds to capacitor 34 of Fig. 1a, is connected in series with a bias voltage $E_m$ across pentode V2 and resistor R2 to form the second branch of a two-branch parallel circuit in which current values $I_1$ and $I_2$ flow respectively. The sum of these current values $I_1$ and $I_2$ equals the substantially constant current value $I$ which is supplied to the two branches of the parallel circuit through a constant current regulator including a triode V3 through which they are connected across the supply conductors energized from a source of voltage $E_d$. The current regulator includes a degenerative resistor R3 and a control element to cathode circuit in which the bias voltage $E_{c3}$ causes the substantially constant current value $I$ to be equal to the current through the pentode V2 when the voltage introduced into its control element circuit at terminals $V_{g2}$ is of zero value. To accomplish this result, it is necessary to apply an additional bias voltage in the control element circuit of pentode V2 which is shown in Fig. 8 and identified as $E_{c2}$. Thus, when control voltage $V_{g2}$ is zero, the current $I_1$ supplied to capacitor C is also zero. The bias voltage $E_m$ connected in circuit with capacitor C and across pentode V2 and its degenerative resistor R2 is of such a value that the anode voltage $E_2$ of pentode V2 is sufficiently elevated so that the anode current of pentode V2 is substantially constant for any value of control voltage $V_{g2}$.

The current limiting resistor $r$ and the arc discharge device V1 of Fig. 8 correspond respectively to resistor 63 and arc discharge device 36 of Fig. 1a. In like manner, the control voltage $V_{g1}$ and the bias voltage $E_{c1}$ correspond respectively to the control voltage applied in circuit with the voltage of biasing capacitor 70 of the circuit shown in Fig. 1a.

A mathematical consideration of the circuit of Fig. 8 is presented in the following equations:

(1) $$I_2 = I_0 + KV_{g2}$$

(2) $$I = I_1 + I_2$$

(3) $$I_1 = I - I_0 - KV_{g2}$$

(4) $$I = I_0$$

(5) $$I_1 = -KV_{g2}$$

(6) $$f = \frac{I_p}{V_s} \cdot \frac{1}{mC}$$

(7) $\quad I'_p = I_1$ and $V'_g = V_{g1}$ (8) $\quad f = \frac{KV_{g2}}{V_{g1}} \cdot \frac{1}{mC}$ When the control voltage $V_{g2}$ in the control element circuit of pentode V2 is zero, its control circuit bias voltage $E_{c2}$ is adjusted so that its anode current is equal to the substantially constant current output of the current regulator tube V3 by reason of the adjustment of its control voltage $E_{c3}$. Thus, as determined by the first five equations in the above table, the charging current $I_1$ to the capacitor C is given by Equation 5. As demonstrated above when considering the operation of the quotient circuit shown in Fig. 1a of the drawings, the frequency of operation of the relaxation oscillator is given by Equation 6. By substituting the values of Equation 7 into Equation 6, Equation 8 is obtained wherein it is demonstrated that the frequency of oscillation of the relaxation oscillator is proportional to the quotient of two input parameters, namely, $V_{g1}$ and $V_{g2}$. Thus, this frequency can be used as in the weld monitor previously described. Furthermore, the particular circuit of Fig. 8 is not subject to the pickup voltages against which the circuit of Fig. 1a must be shielded and the input signals to tubes V1 and V2 need not be electrically separated.

It will be understood that the weld monitor and control illustrated and described above may be variously modified without departing from the spirit and scope of my invention. Other relaying arrangements, differing from those illustrated in Fig. 1c of the drawings, may be employed for utilizing an output signal of the monitor in order to give suitable indications or produce suitable control operations. Furthermore, my weld monitor and control may be applied to any type of resistance welding circuit and is not limited for use with a simplified resistance welding control such as has been illustrated in Fig. 1a and 1c of the drawings. The welder control may embody all the refinements of heat control, slope control and all other types of control which have been found to be desirable under certain circumstances when resistance welding. The simplified welding circuit has been illustrated only in order to show the manner in which my resistance weld monitor and control operates.

With regard to the monitor, it is, of course, apparent that other types of quotient computer circuits than the two described may be employed for energizing the ratio control circuit and that other types of ratio control circuits may be employed with the quotient computers particularly described above. It is also obvious that the square wave generator employed is in no way a limitation as to the type of square wave generator that must be employed since other types of square wave generator may be employed for coupling the output of the quotient circuit to the ratio control circuit. As also pointed out above, the quotient computer and the ratio control circuits have utility in making computations involving other values than the resistance values employed in my monitor. It is also obvious that the quotient circuits disclosed may be used for multiplying two values by a suitable reversal of one of the input voltages thereto.

Thus, while I have shown and described particular embodiments of my invention, it will be quite obvious to those skilled in the art that many other changes and modifications may be made without departing from my invention in its broadest aspects, and I therefore aim in the appended claims to cover all such changes and modifications as fall within the true spirit and scope of my invention.

What I claim as new and desire to secure by Letters Patent of the United States is:

1. A measuring and indicating system comprising a first circuit, means for deriving from said circuit a control voltage which varies in accordance with the voltage across a portion of said circuit, means for deriving from said circuit a control voltage which varies in accordance with the current through said portion, a second circuit, a capacitor included in said second circuit, an impedance included in circuit with said capacitor in said second circuit and controlled in response to a first of said voltages for charging said capacitor in accordance therewith, an arc discharge device having an anode, a cathode and a control element and a control element circuit connecting its said control element and cathode, connections for connecting said anode and cathode across said capacitor, and connections for supplying the other of said control voltages to said control element circuit.

2. A measuring and indicating system comprising a first circuit, means for deriving from said circuit a control voltage which varies in accordance with the voltage across a portion of said circuit, means for deriving from said circuit a second control voltage which varies in accordance with the current flowing in a portion of said circuit, a second circuit, a capacitor included in said second circuit, an impedance included in said second circuit and controlled in response to a first of said control voltages to charge said capacitor in accordance with said first control voltage, an arc discharge device having an anode, a cathode and a control element and a control element circuit connecting its said control element and cathode, conductors for connecting said anode and cathode across said capacitor, connections for supplying the other of said control voltages to said control element circuit and a frequency responsive measuring circuit having input conductors connected to said second circuit to be responsive to the frequency of current variations therein.

3. An electrical measuring and indicating system for obtaining a measurement which depends on the electric resistance of a portion of a circuit comprising in combination, a first circuit, means for deriving from said circuit a first control voltage which varies in accordance with the voltage across a portion of said circuit, means for deriving from said circuit a second control voltage which varies in accordance with the current flowing in said portion, a second circuit, a capacitor included in said second circuit, an impedance connected in said second circuit in series with said capacitor and connected to be controlled by one of said control voltages to charge said capacitor in accordance with said first control voltage, an arc discharge device having an anode, a cathode, a control element and a control element circuit connecting its said control element and cathode, said device having a breakdown voltage depending on the negative bias voltage between its control element and cathode and an extinction voltage below which it ceases to conduct after conduction has been initiated upon the attainment of its breakdown voltage, means for supplying a negative bias voltage in said control element to cathode circuit, conductors for connecting said anode and cathode across the terminals of said capacitor, and connections for supplying the other of said control voltages in the control element circuit of said arc discharge device.

4. An electrical measuring and indicating system for obtaining a measurement which depends on the electric resistance of a portion of a circuit comprising in combination, a first circuit, means for deriving from said circuit a first control voltage which varies in accordance with the voltage across a portion of said circuit, means for deriving from said circuit a second control voltage which varies in accordance with the current flowing in said portion, a second circuit, a capacitor included in said circuit, an impedance connected in said second circuit in series with said capacitor and connected to be controlled by one of said control voltages to charge said capacitor in accordance with the magnitude thereof, an arc discharge device having an anode, a cathode, a control element and a control element circuit connecting its said control element and cathode, conductors for connecting said anode and cathode across the terminals of said capacitor, conductors for supplying the other of said control voltages in said control element circuit, and frequency responsive means having input conductors connected across a portion of said second circuit to be responsive to the frequency of the current in said second circuit.

5. A measuring and indicating system comprising a first circuit, means for deriving from said circuit a first control voltage proportional in magnitude to the voltage across a portion of said circuit, means for deriving from said circuit a second control voltage proportional in magnitude to the current in said portion of said circuit, a second circuit, a capacitor included in said second circuit, an impedance connected in series relationship with said capacitor and connected to be controlled by one of said control voltages for charging it in accordance with the magnitude thereof, an arc discharge device having an anode, a cathode, a control element and a control element circuit connecting its said control element and cathode, said device having a breakdown voltage determined by the negative bias voltage between its control element and cathode and an extinction voltage below which it ceases to conduct after conduction has been initiated upon attainment of its breakdown voltage, conductors for connecting said anode and cathode across said capacitor, means for supplying a negative bias voltage in said control element to cathode circuit, conductors for supplying the other of said control voltages as a component of negative bias voltage in said control element circuit, and a frequency responsive measuring circuit having input conductors connected across a selected portion of said second circuit to be responsive to the frequency of the voltage variations across said selected portion.

6. An electrical measuring and indicating system for use in obtaining a measurement of the resistance of a portion of a circuit comprising in combination, a first circuit, means for deriving from said circuit a control voltage which varies in proportion to the voltage across a portion of said circuit, means for deriving from said circuit another control voltage which varies in proportion to the current in said portion, direct current supply conductors, a second circuit connected across said supply conductors, a capacitor connected in said second circuit, an arc discharge device having an anode, a cathode, a control element and a control element circuit connecting its said control element and cathode, conductors for connecting said anode and cathode across the terminals of said capacitor, an electric discharge device having an anode, a cathode, a control element and a control element circuit connecting its said control element and cathode and having its anode to cathode conducting path connected in series relationship with said capacitor in said second circuit, said electric discharge device having over a wide range of values of anode voltage a substantially constant anode current characteristic for each of its control element to cathode voltages, means for rectifying said control voltages and applying one of said rectified control voltages in the control element circuit of said electric discharge device and the other of said rectified control voltages in the control element circuit of said arc discharge device, two filter circuits having substantially the same ripple characteristics, and means for connecting one of said filter circuits across the control element and cathode of said arc discharge device and the other of said filter circuits across the control element and cathode of said electric discharge device.

7. An electrical measuring and indicating system for use in obtaining a measurment of the electric resistance of a portion of a circuit comprising in combination, a first circuit, means for deriving from said circuit a control voltage which varies in proportion to the voltage across a portion of said circuit, means for deriving from said circuit another control voltage which varies in proportion to the current in said portion, direct current supply conductors, a second circuit connected across said supply conductors, a capacitor connected in said second circuit, an arc discharge device having an anode, a cathode, a control element and a control element circuit connecting its said control element and cathode, said device having a breakdown voltage determined by the negative bias voltage applied between its control element and cathode and an extinction voltage below which it ceases to conduct after conduction has been initiated upon the attainment of its breakdown voltage, conductors for connecting said anode and cathode across the terminals of said capacitor, an electric discharge device having an anode, a cathode, a control element and a control element circuit connecting its said control element and cathode and having its anode to cathode conducting path connected in series relationship with said capacitor in said second circuit, said electric discharge device having over a wide range of values of anode voltage a substantially constant anode current characteristic for each value of its control element to cathode voltage when its anode voltage is above the extinction voltage of said arc discharge device, means for supplying a negative bias voltage in the control element to cathode circuit of said arc discharge device having a value corresponding to the control element to cathode voltage of said device for anode-cathode conduction at an anode voltage equal to its said extinction voltage, means for rectifying said control voltages and applying one of said rectified control voltages in the control element circuit of said electric discharge device and the other of said rectified control voltages in the control element circuit of said arc discharge device, two filter circuits having substantially the same ripple characteristics, means for connecting one of said filter circuits across the control element and cathode of said arc discharge device and the other of said filter circuits across the control element and cathode of said electric discharge device, and a frequency responsive measuring circuit having input conductors connected across a selected portion of said second circuit to be responsive to the frequency of the voltage variations across said selected portion.

8. Apparatus responsive to a predetermined percentage drop in the value of an electric quantity, said apparatus comprising means including an electric oscillator for measuring a change in said electric quantity by a proportional change in its frequency of oscillation, a square wave generator triggered by a frequency output of said oscillator, a pair of circuits each having a resistor and a capacitor, said circuits having a ratio of time constants equal to the desired ratio of the final desired value of said quantity to the maximum value of said quantity which will establish said desired percentage drop in the value of said quantity, direct current supply conductors for applying energization to said resistor-capacitor circuits, a pair of electric discharge devices each having an anode, a cathode, a control element, and a control element circuit connecting its said control element and cathode, means for connecting the anode-cathode circuit of a different one of said electric discharge devices across each of said capacitors of said resistor-capacitor circuits, means for applying a voltage of said square wave generator in the control element circuits of each of said electric discharge devices, a memory circuit which is connected across said capacitor of said resistor-capacitor circuit having the greater time constant and which retains the highest voltage attained across said capacitor during its charging periods, a follower circuit which is connected across said capacitor in the other of said resistor-capacitor circuits and which continually adjusts its voltage to the changing voltage to which said other capacitor is periodically charged, and means responsive to an equality of voltages in said memory and follower circuits for generating a control voltage.

9. Apparatus responsive to a predetermined percentage drop in the resistance of an electric circuit, said apparatus comprising means including an electric oscillator for measuring a change in the electric resistance of said circuit by a proportional change in its frequency of oscillation, means for producing two square wave voltages of substantially equal magnitude, said means including a cross coupled balanced bi-stable conduction state multivibrator having a common trigger circuit and two square wave voltage output circuits each of which is responsive to the change in state of a different side of said multivibrator, means for introducing into the trigger circuit of said multivibrator a voltage responsive to the frequency of oscillation of said electric oscillator, a pair of circuits each including a resistor and a capacitor, said circuits having a ratio of time constants equal to the desired ratio of the final desired resistance to the maximum resistance of said electric circuit which will establish said desired percentage drop in resistance, direct current supply conductors for applying energization to said resistor-capacitor circuits, a pair of electric discharge devices each having an anode, a cathode, a control element, and a control element circuit connecting its said control element and cathode, means for connecting the anode-cathode circuit of a different one of said electric discharge devices across each of said capacitors of said resistor-capacitor circuits, means for connecting a different one of said square wave voltage output circuits of said multivibrator in the control element circuits of each of said electric discharge devices, a memory capacitor connected in series circuit with a rectifier across said capacitor of said resistor-capacitor circuit having the greater time constant, a follower capacitor connected in series circuit with a rectifier across said other capacitor of said other resistor-capacitor circuit, a discharge resistor connected across said follower capacitor for discharging said follower capacitor at a rate that will permit said capacitor to follow the decreasing voltages to which said other capacitor of said other resistor-capacitor circuit is periodically charged, means responsive to an equality of voltages across said memory capacitor and said follower capacitor for supplying a control signal, and means responsive to said control signal for providing an indication thereof.

10. Apparatus responsive to a predetermined percentage drop in the resistance of an electric circuit, said apparatus comprising means including an electric oscillator for measuring a change in the electric resistance of said circuit by a proportional change in its frequency of oscillation, a square wave generator triggered by a frequency output of said oscillator, a pair of circuits each including a resistor and a capacitor, said circuits having a ratio of time constants equal to the desired ratio of the final desired resistance to the maximum resistance of said electric circuit which will establish said desired percentage drop in resistance, direct current supply conductors for applying energization to said resistor-capacitor circuits, a pair of electric discharge devices each having an anode, a cathode, a control element, and a control element circuit connecting its said control element and cathode, means for connecting the anode-cathode circuit of a different one of said electric discharge devices across each of said capacitors of said resistor-capacitor circuits, means for applying a voltage of said square wave generator in the control element circuits of each of said electric discharge devices, a memory circuit which is connected across said capacitor of said resistor-capacitor circuit having the greater time constant and which retains the highest voltage attained across said capacitor during its charging periods, a follower circuit which is connected across said capacitor in the other of said resistor-capacitor circuits and which continually adjusts its voltage to the changing voltage to which said other capacitor is periodically charged, means responsive to an equality of voltages in said memory and follower circuits for supplying a control signal, and means responsive to said control signal for providing an indication thereof.

11. Apparatus responsive to a predetermined percentage drop in the resistance of an electric circuit, said apparatus comprising means including an electric oscillator for measuring a change in the electric resistance of said circuit by a proportional change in its frequency of oscillation, a square wave generator triggered by a frequency output of said oscillator, a pair of circuits each including a resistor and a capacitor, said circuits having a ratio of time constants equal to the desired ratio of the final desired resistance to the maximum resistance of said electric circuit which will establish said desired percentage drop in resistance, direct current supply conductors for applying energization to said resistor-capacitor circuits, a pair of electric discharge devices each having an anode, a cathode, a control element, and a control element circuit connecting its said control element and cathode, means for connecting the anode-cathode circuit of a different one of said electric discharge devices across each of said capacitors of said resistor-capacitor circuits, means for applying a voltage of said square wave generator in the control element circuits of each of said electric discharge devices, a memory circuit which is connected across said capacitor of said resistor-capacitor circuit having the greater time constant and which retains the highest voltage attained across said capacitor during its charging periods, a follower circuit which is connected across said capacitor in the other of said resistor-capacitor circuit and which continually adjusts its voltage to the changing voltage to which said other capacitor is periodically charged, means responsive to an equality of voltages in said memory and follower circuits for supplying a control signal, means responsive to said control signal for providing an indication thereof, means for initiating current flow through said electric circuit of changing resistance, and time delay means responsive to current flow in said electric circuit for rendering said indicating means non-responsive to said control signal for a predetermined interval of time after the initiation of current flow in said electric circuit.

12. Apparatus responsive to a predetermined percentage drop in the resistance of an electric circuit, said apparatus comprising means including an electric oscillator for measuring a change in the electric resistance of said circuit by a proportional change in its frequency of oscillation, a square wave generator triggered by a frequency output of said oscillator, a pair of resistor-capacitor circuits having a ratio of time constants equal to the desired ratio of the final desired resistance to the maximum resistance of said electric circuit which will establish said desired percentage drop in resistance, direct current supply conductors for applying energization to said resistor-capacitor circuits, a pair of electric discharge devices each having an anode, a cathode, a control element, and a control element circuit connecting its said control element and cathode, means for connecting the anode-cathode circuit of a different one of said electric discharge devices across each of said capacitors of said resistor-capacitor circuits, means for applying a voltage of said square wave generator in the control element circuits of each of said electric discharge devices, a memory capacitor connected in series circuit with a rectifier across said capacitor of said resistor-capacitor circuit having the greater time constant, a follower capacitor connected in series circuit with a rectifier across said other capacitor of other resistor-capacitor circuit, a discharge resistor connected across said follower capacitor for discharging said follower capacitor at a rate that will permit said capacitor to follow the decreasing voltages to which said other capacitor of said other resistor-capacitor circuit is periodically charged, means responsive to an equality of voltages across said memory capacitor and said follower capacitor for supplying a control signal, and means responsive to said control signal for providing an indication thereof.

13. Apparatus responsive to a predetermined percentage drop in the resistance of an electric circuit, said apparatus comprising means for deriving two signal voltages each of which varies in accordance with said resistance of said circuit, a capacitor, circuit means including an impedance in circuit with said capacitor for charging it in accordance with one of said signal voltages, an arc discharge device having an anode, a cathode, a control element, and a control element circuit connecting its said control element and cathode, circuit means including the anode-cathode circuit of said arc discharge device for discharging said capacitor, means for introducing the other of said signal voltages into the control element circuit of said arc discharge device, means for producing two square wave voltages of substantially equal magnitude, said means including a cross coupled balanced bi-stable conduction state multivibrator having a common trigger circuit and two square wave output voltage circuits each of which is responsive to the change in state of a different side of said multivibrator, means for introducing into the trigger circuit of said multivibrator voltages responsive to the charging and discharging of said capacitor, a pair of circuits each including a resistor and a capacitor, said circuits having a ratio of time constants equal to the desired ratio of the final desired resistance to the maximum resistance of said electric circuit which will establish said desired percentage drop in resistance, direct current supply conductors for applying energization to said resistor-capacitor circuits, a pair of electric discharge devices each having an anode, a cathode, a control element, and a control element circuit connecting its said control element and cathode, means for connecting the anode-cathode circuit of a different one of said electric discharge devices across each of said capacitors of said resistor-capacitor circuits, means for connecting a different one of said square wave output voltage circuits of said multivibrator in the control element circuits of each of said electric discharge devices, a memory capacitor connected in series circuit with a rectifier across said capacitor of said resistor-capacitor circuit having the greater time constant, a follower capacitor connected in series circuit with a rectifier across said other capacitor of said other resistor-capacitor circuit, a discharge resistor connected across said follower capacitor for discharging said follower capacitor at a rate that will permit said capacitor to follow the decreasing voltages to which said other capacitor of said other resistor-capacitor circuit is periodically charged, means responsive to an equality of voltages across said memory capacitor and said follower capacitor for supplying a control signal, and means responsive to said control signal for providing an indication thereof.

14. Apparatus responsive to a predetermined percentage drop in the resistance of a portion of a circuit through which alternating current is supplied, said apparatus comprising means for obtaining a control voltage which varies in accordance with the voltage across said portion, means for obtaining a second control voltage which varies in accordance with the current supplied through said portion, a capacitor, an arc discharge device having an anode, a cathode, a control element, and a control element circuit connecting its said control element and cathode, means for connecting the anode-cathode circuit of said arc discharge device across the terminals of said capacitor, an electric discharge device having an anode, a cathode, a control element, and a control element circuit connecting its said control element and cathode, said device having over a wide range of its operating anode voltage a substantially constant anode current characteristic for each of its control element to cathode voltages, direct current supply conductors, means including the anode-cathode circuit of said electric discharge device for connecting said capacitor across said direct current supply conductors, means for rectifying said control voltages and applying one of said rectified control voltages in the control element circuit of said electric discharge device to effect charging of said capacitor and the other of said rectified control voltages in the control element circuit of said arc discharge device to effect discharge of said capacitor, two filter circuits having substantially the same ripple characteristics and means for connecting one of said filter circuits across the control element and cathode of said arc discharge device and the other of said filter circuits across the control element and cathode of said electric discharge device, means for producing two square wave voltages of substantially equal magnitude, said means including a cross coupled balanced bi-stable conduction state multivibrator having a common trigger circuit and two square wave voltage output circuits each of which is responsive to the change in state of a different side of said multivibrator, means for supplying voltage responsive to the charging and discharging of said capacitor in the trigger circuit to said multivibrator, a pair of resistor-capacitor circuits having a ratio of time constants equal to the desired ratio of the final desired resistance to the maximum resistance of said object which will establish said desired percentage drop in resistance, direct current supply conductors for applying energizing to said resistor-capacitor circuits, a pair of electric discharge devices each having an anode, a cathode, a control element, and a control element circuit connecting its said control element and cathode, means for connecting the anode-cathode circuit of a different one of said pair of electric discharge devices across each of said capacitors of said resistor-capacitor circuits, means for connecting a different one of said square wave voltage output circuits of said multivibrator in the control element circuits of each of said pair of electric discharge devices, a memory capacitor connected in series circuit with a rectifier across said capacitor of said resistor-capacitor circuit having the greater time constant, a follower capacitor connected in series circuit with a rectifier across said other capacitor of said other resistor-capacitor circuit, a discharge resistor connected across said follower capacitor for discharging said follower capacitor at a rate that will permit said capacitor to follow the decreasing voltages to which said other capacitor of said other resistor-capacitor circuit is periodically charged, and means responsive to an equality of voltages across said memory capacitor and said follower capacitor for supplying a control signal.

15. Apparatus for detecting a predetermined increase in the frequency of a signal voltage, said apparatus comprising a square wave generator triggered by said signal voltage, a pair of circuits each including a resistor and a capacitor, said circuits having a ratio of time constants equal to the ratio of the periods of said signal voltage at said predetermined increase in frequency and at its minimum frequency, direct current supply conductors for applying energization to said resistor-capacitor circuits, a pair of electric discharge devices each having an anode, a cathode, a control element, and a control element circuit connecting its said control element and cathode, means for connecting the anode-cathode circuit of a different one of said electric discharge devices across each of said capacitors of said resistor-capacitor circuits, means for applying a voltage of said square wave generator in the control element circuits of each of said electric discharge devices, a memory circuit which is connected across said capacitor of said resistor-capacitor circuit having the greater time constant and which retains the highest voltage attained across said capacitor during its charging periods, a follower circuit which is connected across said capacitor in the other of said resistor-capacitor circuit and which continually adjusts its voltage to the changing voltage to which said other capacitor is periodically charged, and means responsive to an equality of voltages in said memory and follower circuits for supplying a control signal.

16. An electric computer comprising an electric discharge device having an anode, a cathode, a control element, and a control element circuit connecting its said control element and cathode, said electric discharge device having for each control voltage in its said control element circuit a substantially constant anode current characteristic for anode voltages above a predetermined magnitude, a substantially constant current circuit having two branches, one of which includes the anode-cathode circuit of said electric discharge device and the other of which includes a capacitor connected in series with a bias voltage greater than said voltage of predetermined magnitude required for imparting said substantially constant anode current characteristics to said electric discharge device, a bias voltage connected in the control element circuit of said electric discharge device and having a value substantially equal to that which produces anode-cathode current flow in said electric discharge device equal to the total current flow in said substantially constant current circuit in a branch of which the anode-cathode circuit of said electric discharge device is connected, an arc discharge device having an anode, a cathode, a control element, and a control element circuit connecting its said control element and cathode, means for connecting the anode-cathode circuit of said arc discharge device across the terminals of said capacitor, an electric circuit, means for deriving from said last mentioned circuit two signal voltages, each of which varies in accordance with an electrical quantity of said circuit, means for introducing one of said signal voltages in the control element circuit of said electric discharge device, and means for introducing the other of said signal voltages in the control element circuit of said arc discharge device.

17. An electric computer comprising an electric discharge device having an anode, a cathode, a control element, and a control element circuit connecting its said control element and cathode, said electric discharge device having for each control voltage in its said control element circuit a substantially constant anode current characteristic for anode voltages above a predetermined magnitude, a substantially constant current circuit having two branches, one of which includes the anode-cathode circuit of said electric discharge device and the other of which includes a capacitor connected in series with a bias voltage greater than said voltage of predetermined magnitude required for imparting said substantially constant anode current characteristics to said electric discharge device, a bias voltage connected in the control element circuit of said electric discharge device and having a value substantially equal to that which produces anode-cathode current flow in said electric discharge device equal to the total current flow in said substantially constant current circuit in a branch of which the anode-cathode circuit of said electric discharge device is connected, an arc discharge device having an anode, a cathode, a control element, and a control element circuit connecting its said control element and cathode, said device having a breakdown voltage determined by the negative bias voltage applied between its control element and cathode and an extinction voltage below which it ceases to conduct after conduction has been initiated upon the attainment of its breakdown voltage, means for connecting the anode-cathode circuit of said arc discharge device across the terminals of said capacitor, a bias voltage connected in the control element circuit of said arc discharge device and having a value corresponding to the control element to cathode voltage of said device for anode-cathode conduction at an anode voltage equal to its said extinction voltage, an electric circuit, means for deriving from said last mentioned circuit two signal voltages, each of which varies in accordance with an electrical quantity of said last mentioned circuit, means for introducing one of said signal voltages in the control element circuit of said electric discharge device, and means for introducing the other of said signal voltages in the control element circuit of said arc discharge device.

References Cited in the file of this patent
UNITED STATES PATENTS

| | | |
|---|---|---|
| 2,370,009 | Clark et al. | Feb. 20, 1945 |
| 2,472,043 | Callender | May 31, 1949 |
| 2,486,552 | Callender | Nov. 1, 1949 |
| 2,508,328 | Davies | May 16, 1950 |
| 2,688,740 | Merrill et al. | Sept. 7, 1954 |